United States Patent
Williamson et al.

(10) Patent No.: US 8,511,736 B2
(45) Date of Patent: Aug. 20, 2013

(54) RIGID TONNEAU COVER AND CLAMP MECHANISM THEREFOR

(75) Inventors: Scott A. Williamson, Orlando, FL (US); Michael Williamson, Corunna, MI (US); David Kosinski, Northville, MI (US); Thomas Dean Walser, Chesaning, MI (US)

(73) Assignee: Rugged Liner, Inc., Owosso, MI (US)

( * ) Notice: Subject to any disclaimer, the term of this patent is extended or adjusted under 35 U.S.C. 154(b) by 104 days.

(21) Appl. No.: 13/181,035

(22) Filed: Jul. 12, 2011

(65) Prior Publication Data

US 2013/0015678 A1     Jan. 17, 2013

(51) Int. Cl.
*B60P 7/02*     (2006.01)

(52) U.S. Cl.
USPC .................. 296/100.07; 296/100.17; 224/558

(58) Field of Classification Search
USPC ................. 296/37.6, 100.01, 100.02, 100.06, 296/100.07, 100.08, 100.09, 100.17, 136.03; 224/555, 558, 560, 570; 292/DIG. 11, DIG. 42
See application file for complete search history.

(56) References Cited

U.S. PATENT DOCUMENTS

| | | | |
|---|---|---|---|
| 4,844,531 A | 7/1989 | Kooiker | |
| 4,946,217 A | 8/1990 | Steffens et al. | |
| 5,190,341 A | 3/1993 | Simard | |
| 5,255,946 A | 10/1993 | Allerding et al. | |
| 5,427,428 A | 6/1995 | Ericson et al. | |
| 5,540,475 A | 7/1996 | Kersting et al. | |
| 5,636,893 A | 6/1997 | Wheatley et al. | |
| 5,653,491 A | 8/1997 | Steffens et al. | |
| 6,059,350 A | 5/2000 | Kooiker | |
| 6,352,296 B1 | 3/2002 | Kooiker | |
| 6,422,635 B1 | 7/2002 | Steffens et al. | |
| 6,565,141 B1 | 5/2003 | Steffens et al. | |
| 6,827,389 B1 | 12/2004 | Pandorf | |
| 7,188,888 B2 | 3/2007 | Wheatley et al. | |
| 7,334,830 B2 | 2/2008 | Weldy | |
| 7,384,090 B1 | 6/2008 | Weldy | |
| 7,484,788 B2 | 2/2009 | Calder et al. | |
| 7,537,264 B2 | 5/2009 | Maimin et al. | |
| 7,823,957 B2 | 11/2010 | Williamson et al. | |
| 8,262,148 B2 * | 9/2012 | Rusher et al. | 296/100.06 |
| 2001/0035664 A1 | 11/2001 | Steffens et al. | |
| 2005/0099033 A1 | 5/2005 | Chverchko et al. | |
| 2006/0208524 A1 * | 9/2006 | Brown et al. | 296/100.01 |
| 2007/0052257 A1 | 3/2007 | Allen | |
| 2008/0129077 A1 | 6/2008 | Weldy | |
| 2010/0270824 A1 * | 10/2010 | Yue | 296/100.07 |
| 2011/0260493 A1 * | 10/2011 | Xu | 296/100.07 |

\* cited by examiner

*Primary Examiner* — Glenn Dayoan
*Assistant Examiner* — Jason S Daniels
(74) *Attorney, Agent, or Firm* — Howard & Howard Attorneys PLLC

(57) ABSTRACT

A tonneau cover for selectively enclosing a space within a cargo box. The cover has an elongate channel laterally extending between a proximate end located proximate a side edge of the cover and a distal end at which the channel terminates. The cover includes a clamp mechanism slidably engaged with the channel, and the clamp mechanism includes a handle, a block member slidably received in the channel, an elongate rod member coupled to the handle, and a latch or hook member connected to the rod member. The latch member is moveable between a clamped position for operatively engaging a portion of the cargo box and a released position for spacing the latch member from and placing the latch member out of operative engagement with the cargo box. The handle and rod member are positioned in the channel in the clamp mechanism stowed position.

27 Claims, 23 Drawing Sheets

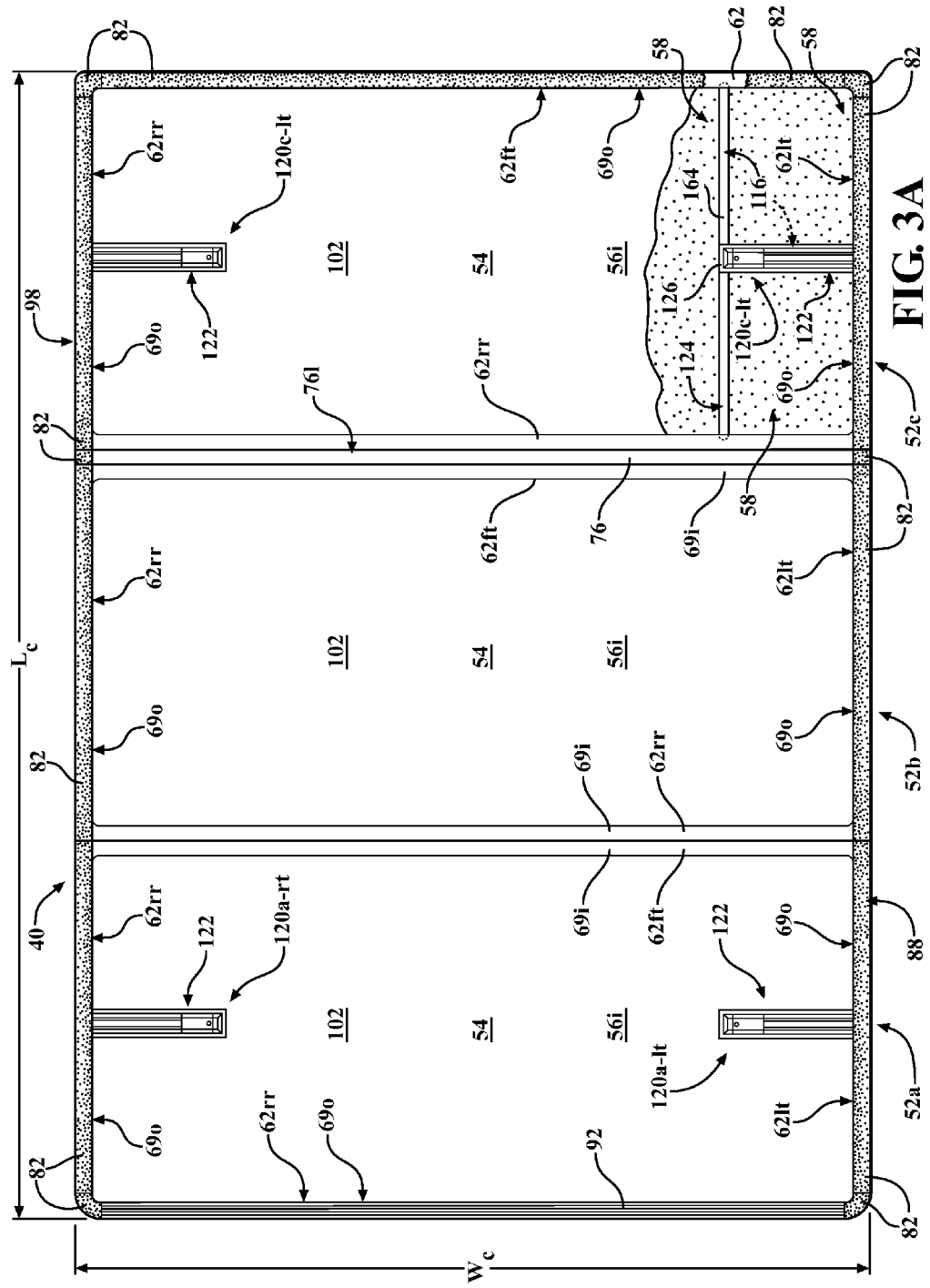

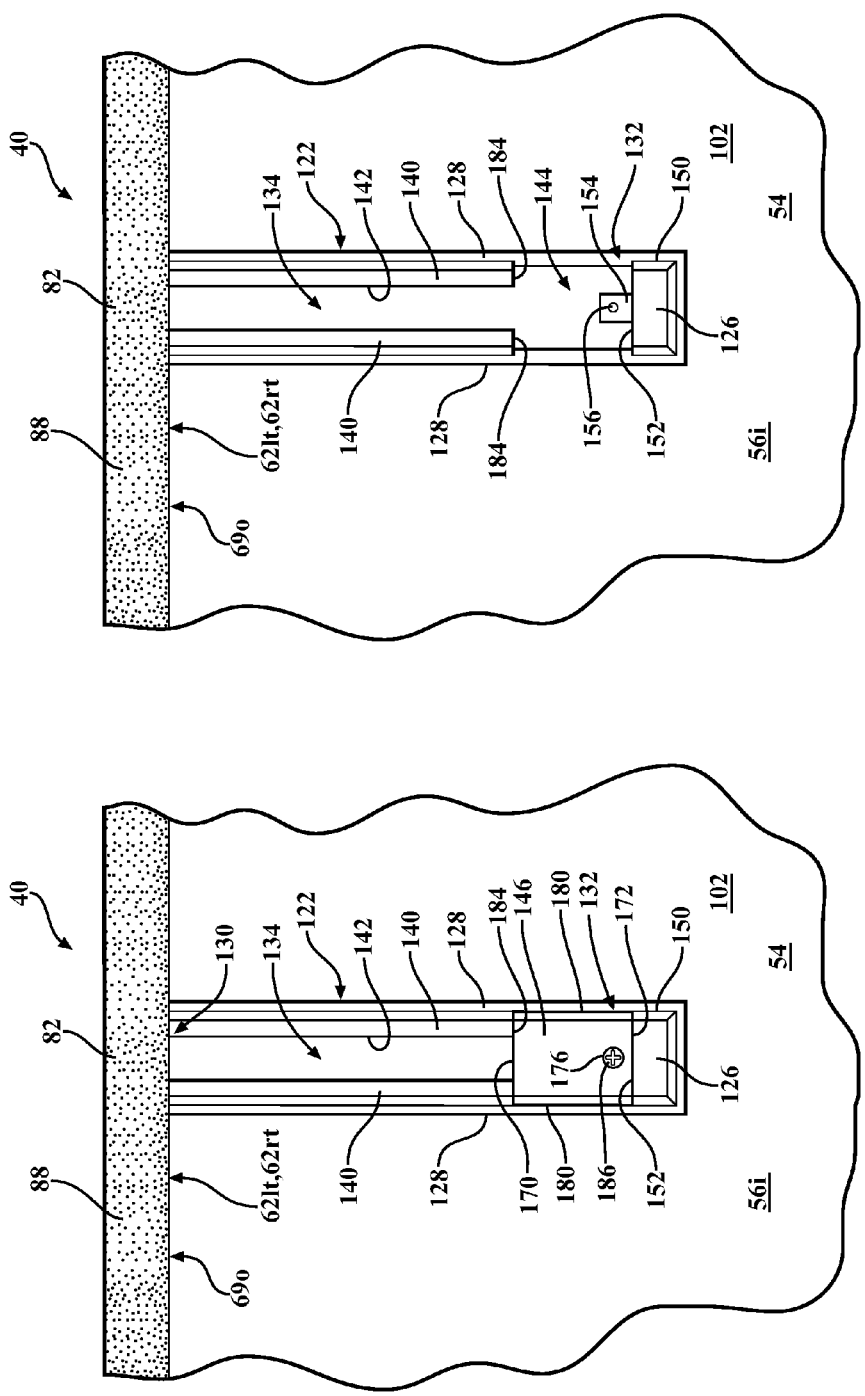

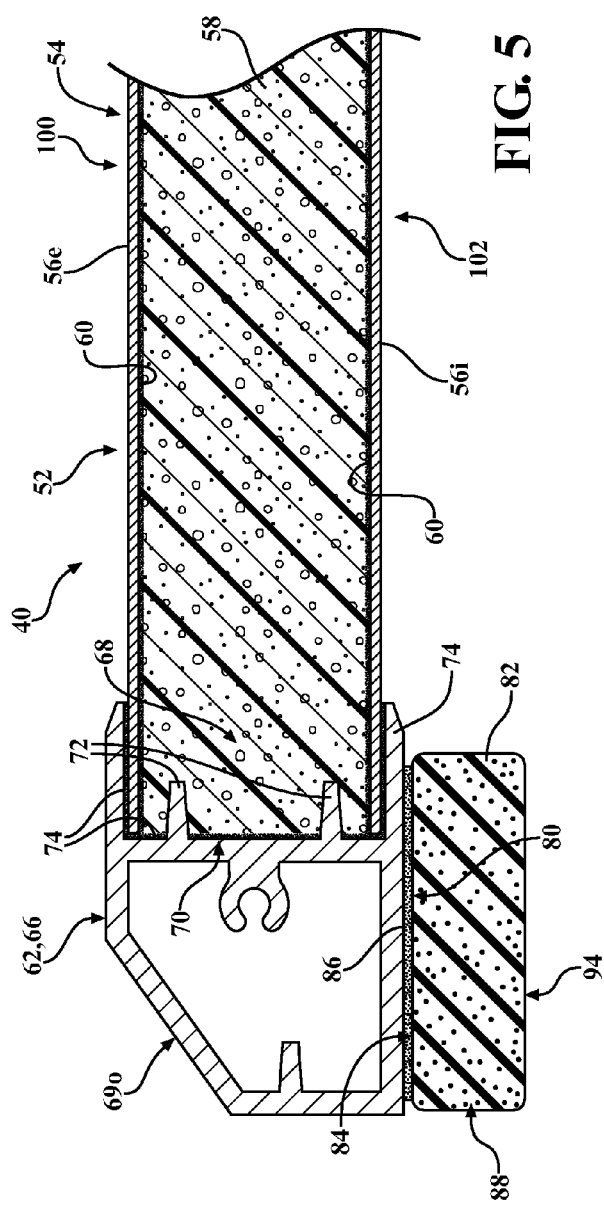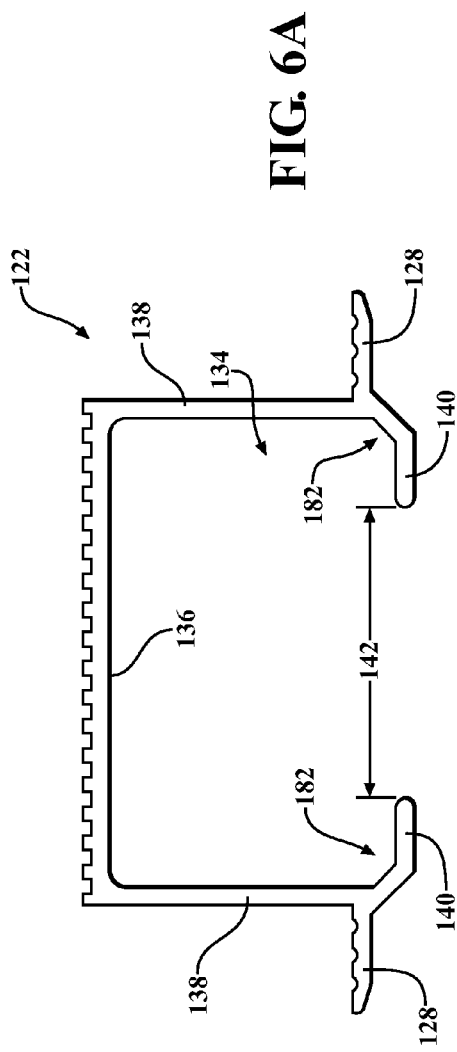

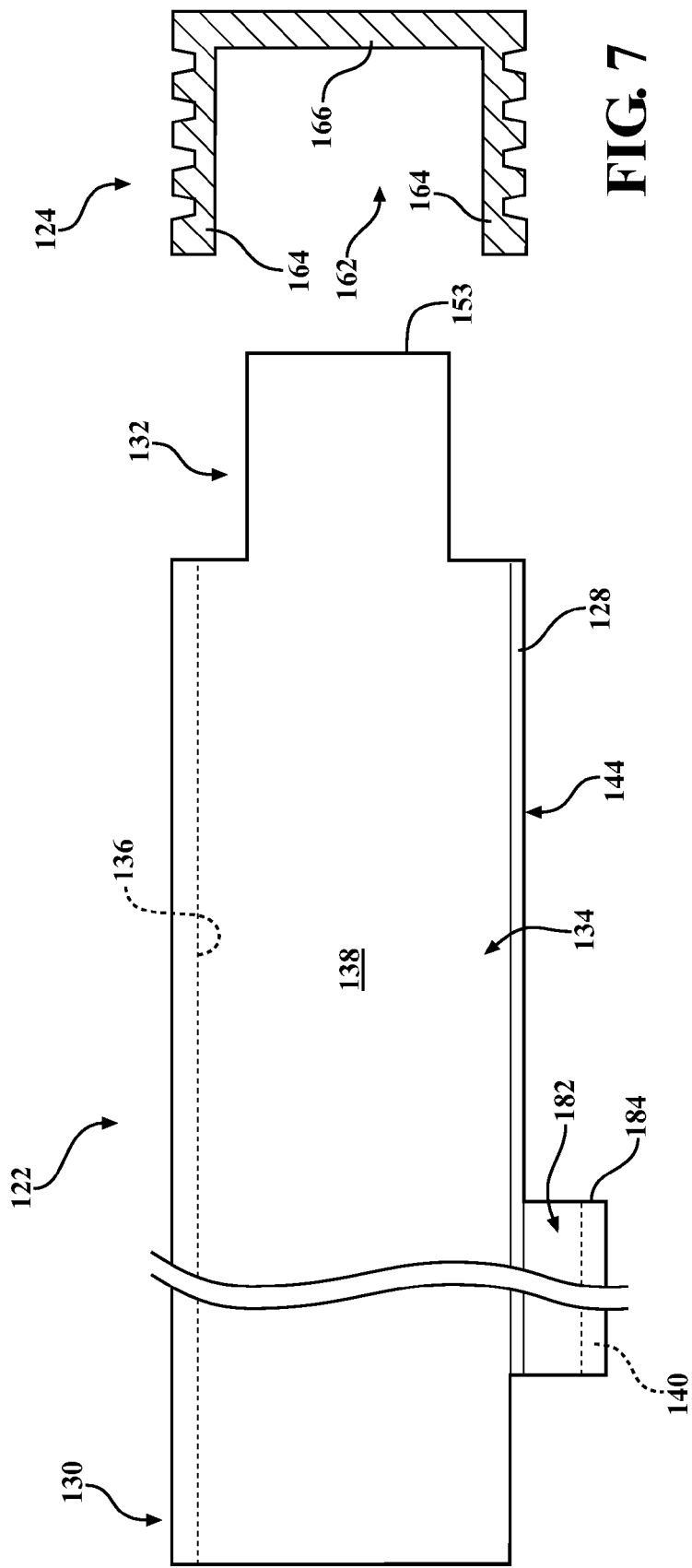

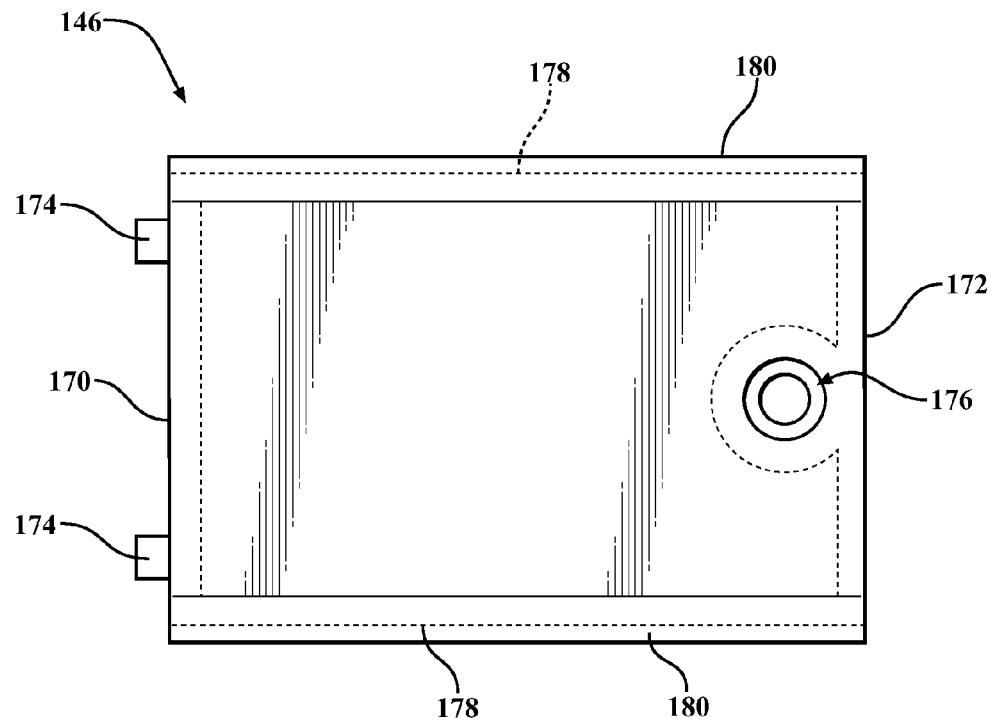
FIG. 9A
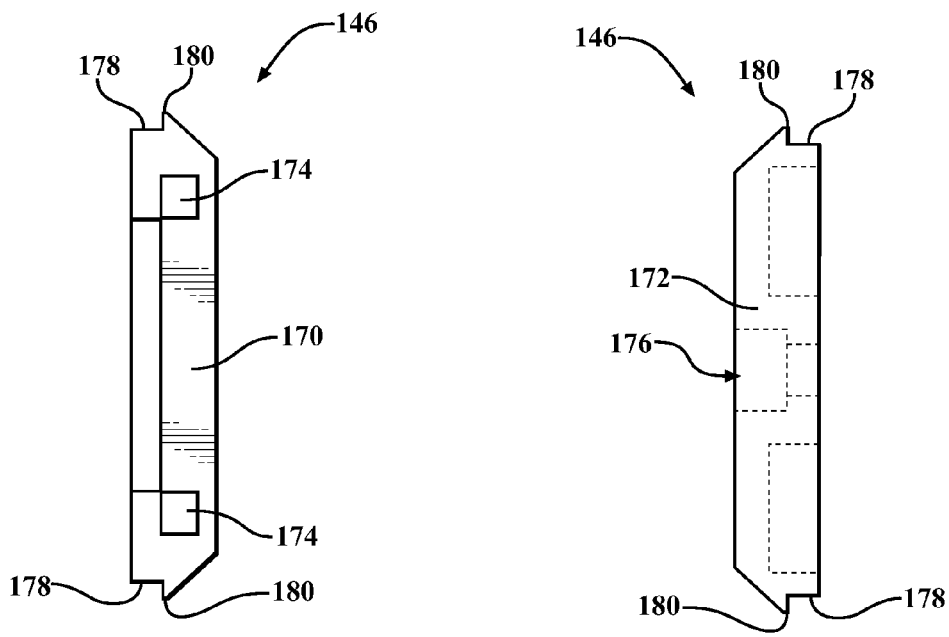
FIG. 9B   FIG. 9C

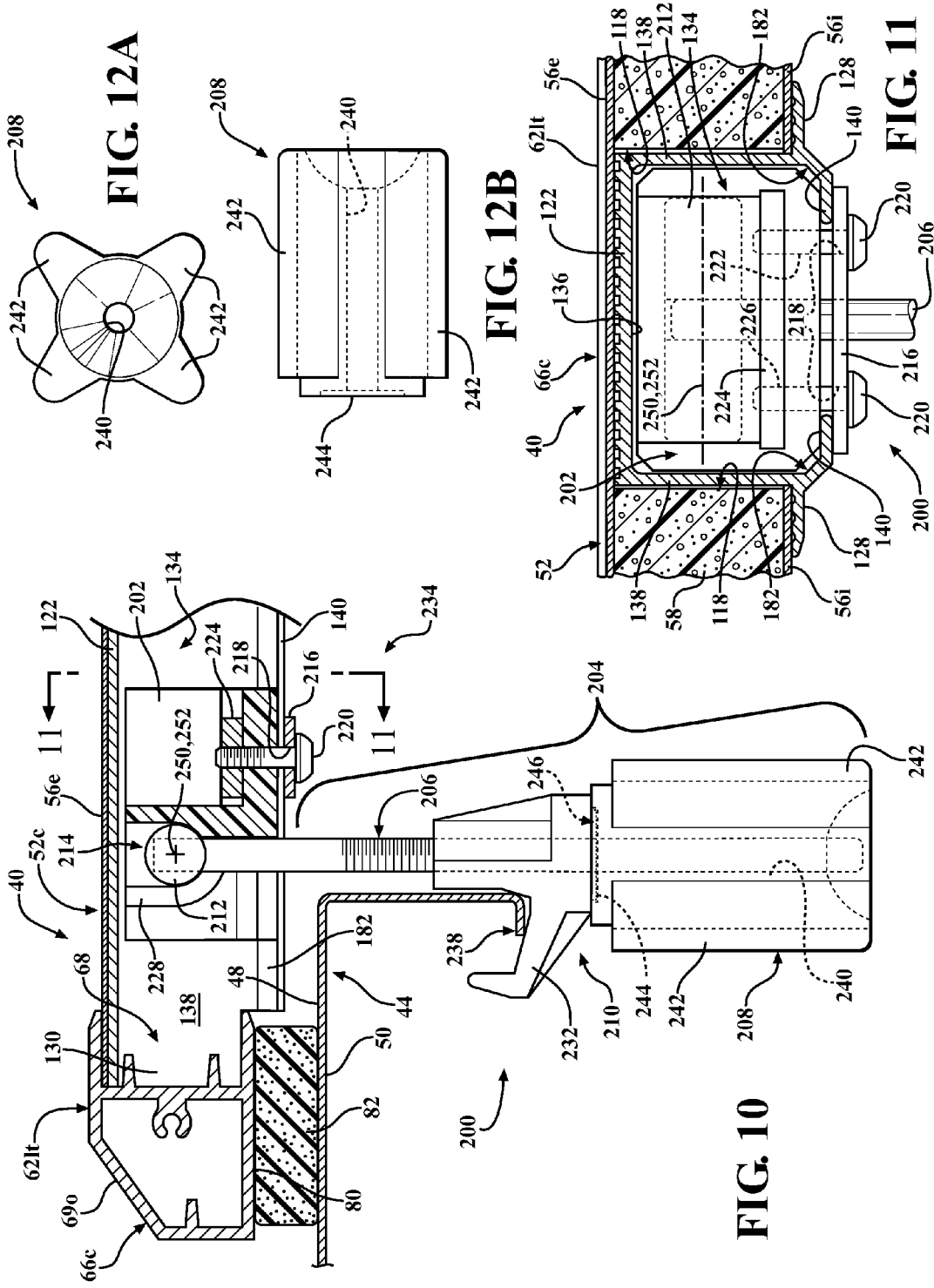

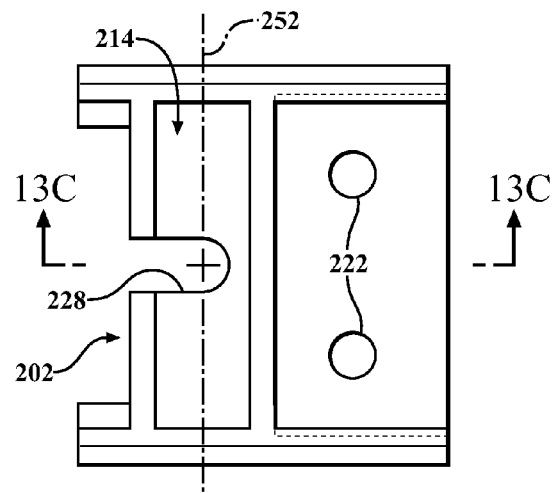
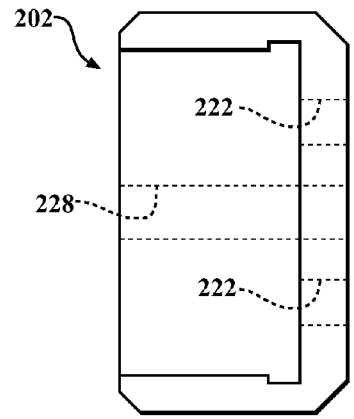
FIG. 13A  FIG. 13B
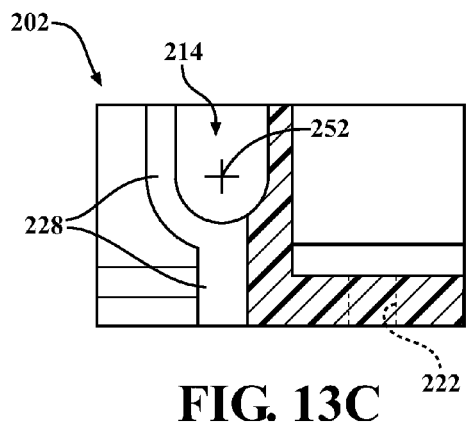
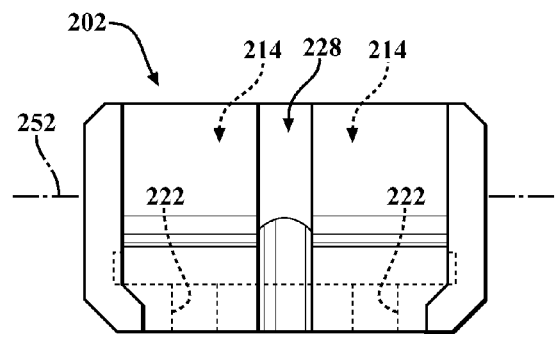
FIG. 13C  FIG. 13D
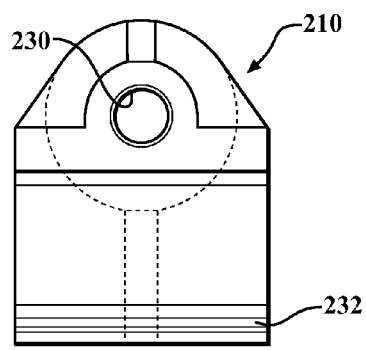
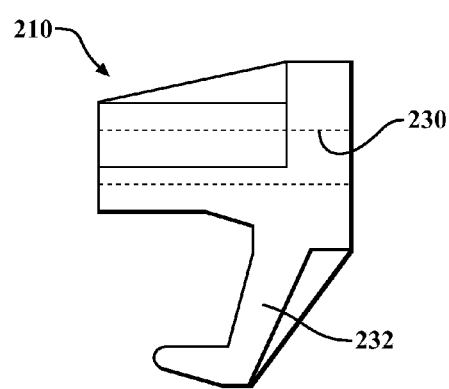
FIG. 14A  FIG. 14B

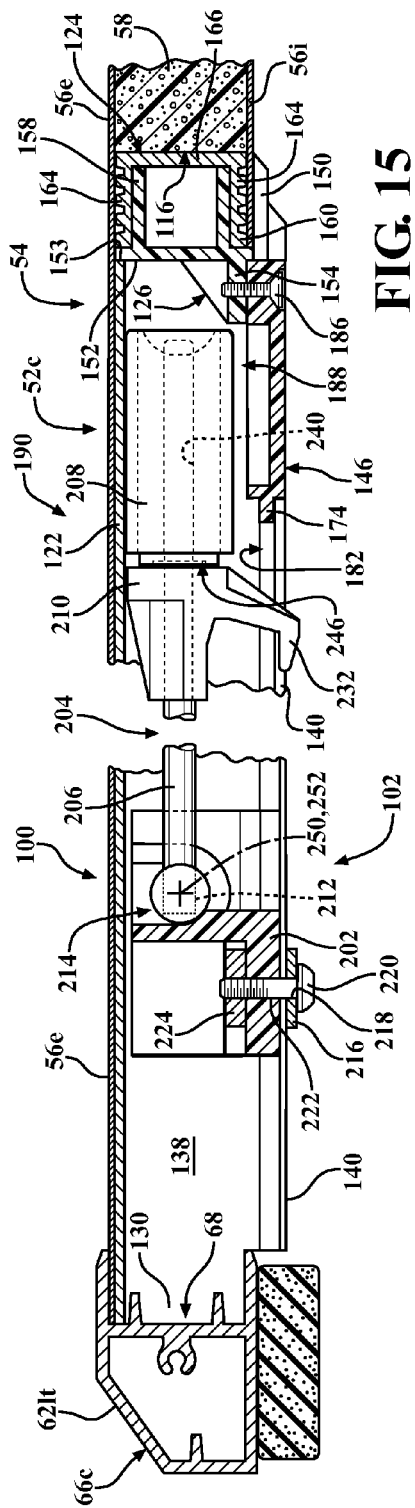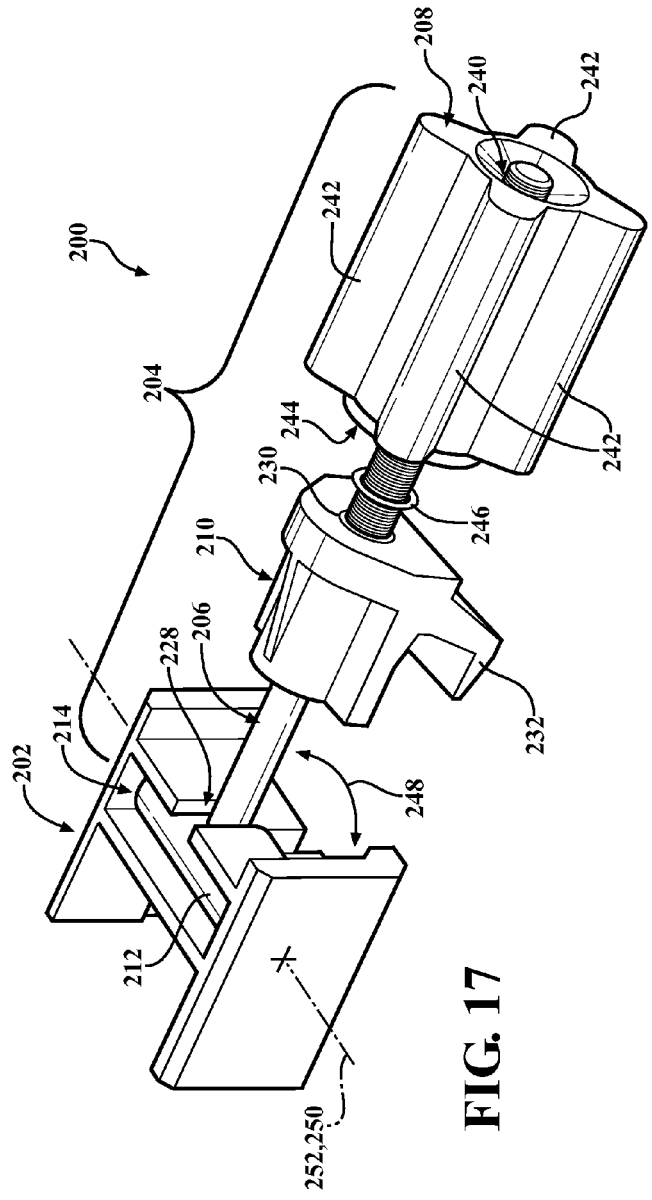
FIG. 15
FIG. 17

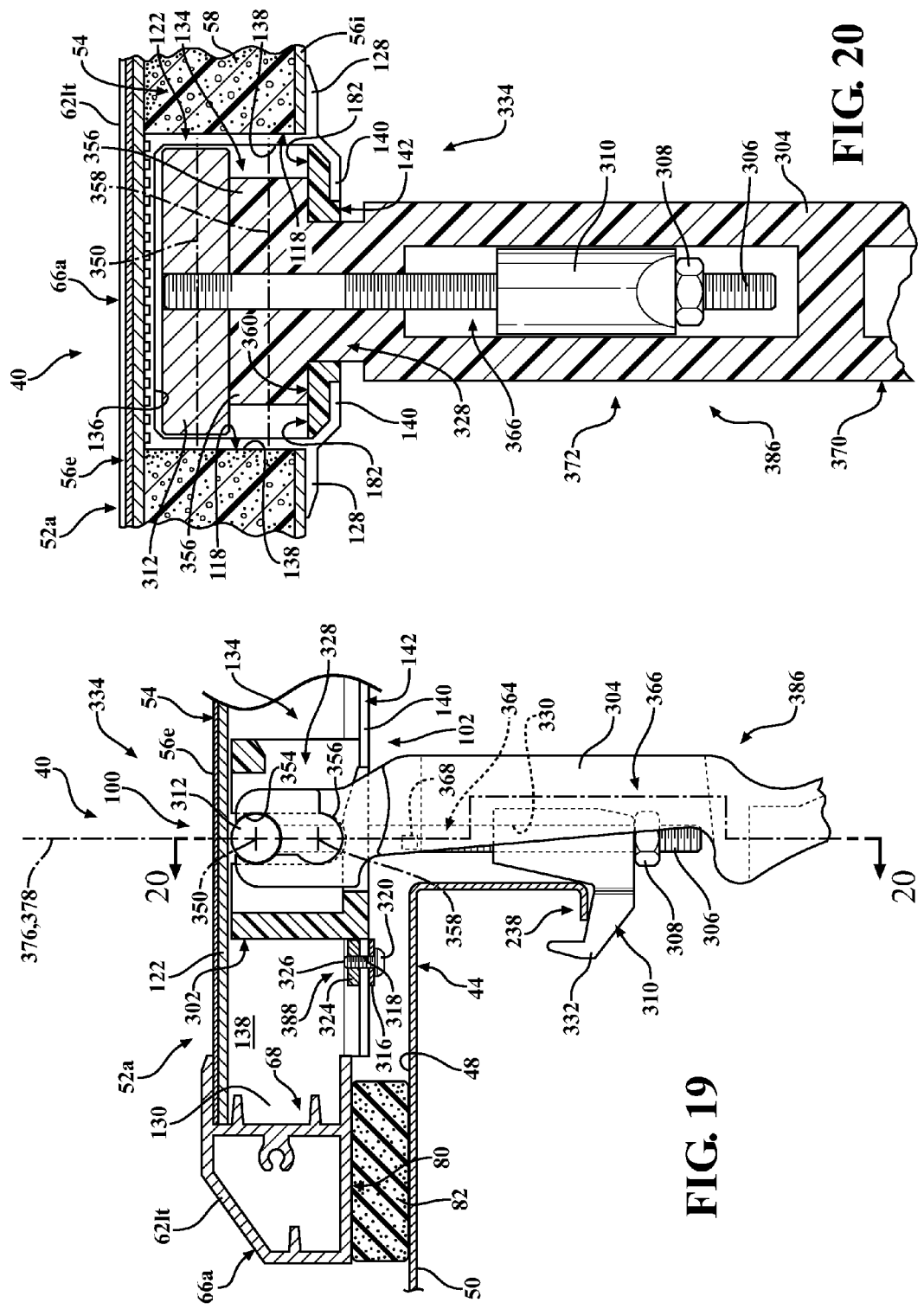

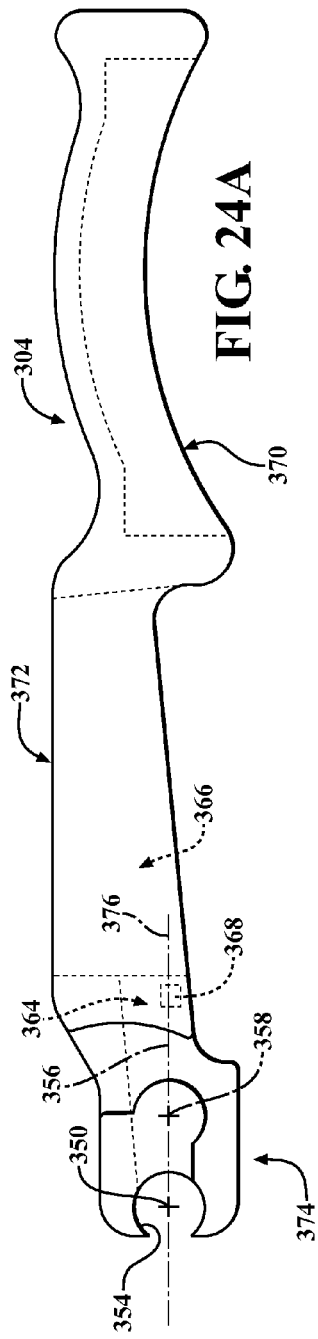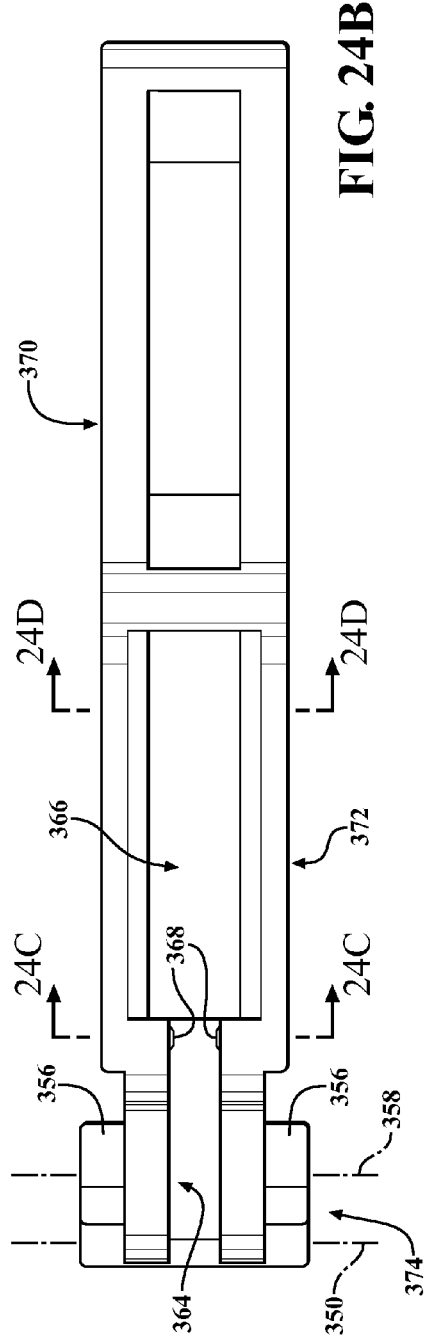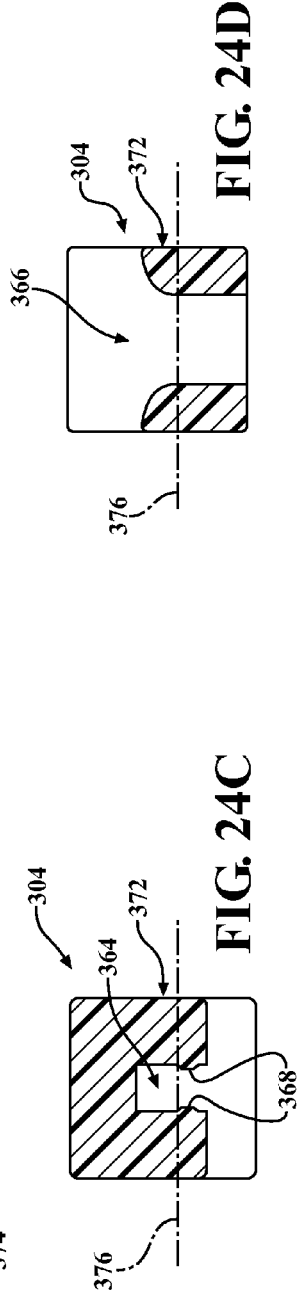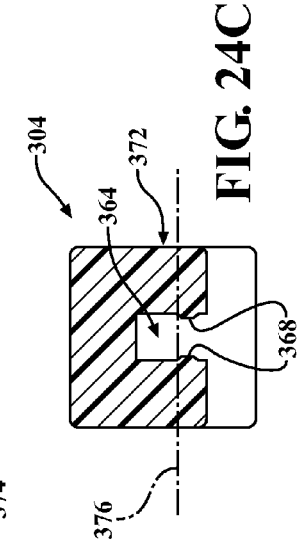

RIGID TONNEAU COVER AND CLAMP MECHANISM THEREFOR

BACKGROUND OF THE INVENTION

1. Field of the Invention

The present invention generally relates to a protective cover assembly for covering a space, particularly to a rigid tonneau cover for covering the space within a cargo box or bed of a pickup truck. More particularly, the present invention relates to clamp systems for securing a rigid tonneau cover over the space.

2. Description of the Related Art

Protective cover assemblies such as tonneau covers are well known for protecting spaces with the cargo boxes of pickup trucks. In recent years, various clamp systems have been employed to secure the protective cover over the protected space. The clamp systems eliminate the need to permanently alter the integrity of the truck cargo box walls defining the space and allow the protective cover to be easily removed. Examples of clamp systems can be found in U.S. Pat. No. 7,334,830 to Ross Weldy, and U.S. Pat. No. 7,188,888 to Donald Wheatley and David Daley.

The '830 patent discloses a clamp system having a handle for moving the clamp system between an operational position and a stowed position. A latch member is disposed adjacent the handle which defines a cammed profile for biasing the latch member against the wall defining the space. A track is defined by the support bow for guiding the clamp system. A bolt comprising a head and a shank couples the handle and latch member to the track. The head of the bolt rides within the track between the operational and stowed positions. The support bow additionally defines a slot substantially perpendicular to the track for accepting and securing the shank of the bolt and holding the clamp mechanism in the stowed position. When in the stowed position the clamp system is held cantilevered, substantially perpendicular to the track. The '888 patent discloses a clamp system having a front clamp and a rear clamp. Both the front and rear clamps include a handle for moving the clamp system along a track defined by the support bow. A threaded member comprising a shank and a trunnion member couples the handle to a track defined by the support bow. A pair of wheels is disposed on the trunnion member for guiding each of the clamps between an operational position and a stowed position. Additionally, the rear handle is spring loaded for biasing the latch member against the wall. When the clamp system of the '888 patent is in the stowed position, the handle is disposed within the track substantially flush with the support bow.

The '830 and '888 patents disclose soft tonneau covers requiring a frame that includes laterally extending support bows to provide the unfolded cover with a desired, upwardly projecting contour that easily sheds water, and having a clamping system defined by support bows of the frame, to which the clamp mechanisms are attached.

Rigid, folding tonneau offer many advantages over soft covers, such as improved durability, weather protection and security, and easier and faster installation. These covers typically include rigid, folding panels that provide the desired cover contour and support, but do not require or include the support bows to which the clamp mechanisms of soft tonneau covers are conveniently attached.

There are currently commercialized rigid, folding tonneau covers that include a clamping system having spring-actuated clamp mechanisms. These covers require multiple tools to facilitate installation, and permit unauthorized access to the enclosed cargo box space to anyone who forces the cover, at the tailgate end, upwardly against the bias of its clamping springs. Moreover, spring-actuated clamp mechanisms such as those employed on these covers require more strength and effort than some consumers have or wish to expend when latching and unlatching a tonneau cover.

Therefore, an opportunity remains to develop an improved clamp system for reliably securing a rigid, folding protective cover assembly over a cargo box space, that improves security vis-à-vis existing commercial offerings, is easier to operate and install, and facilitates clamp mechanism storage securely against the interior of the cover to prevent possible damage to, or by, the clamp mechanism.

It is desirable to provided an improved rigid, folding tonneau cover having an improved clamp system that is easy to use with low effort, simple to adjust and replace components if necessary, and maintains its stowed position during cover folding motion, thereby preventing damage to the cover, and providing superior durability, dent resistance, cargo protection from the elements, and cargo security, vis-à-vis prior tonneau covers.

SUMMARY OF THE INVENTION

The present invention provides a tonneau cover for selectively enclosing a space within a cargo box. The cover includes a substantially rigid panel having spaced front and rear edges, and opposite side edges between which the front and rear edges laterally extend. The substantially rigid panel is provided with an elongate channel laterally extending between a proximate end located proximate one of the side edges and a distal end at which the channel terminates. A clamp mechanism is slidably engaged with the channel, and has operative and stowed positions spaced along the channel. The clamp mechanism includes a handle, a block member slidably received in the channel with the handle and the block member having relative movement, an elongate rod member coupled to the handle and the block member with the handle and the rod member having relative movement, and a latch member connected to the rod member. The latch member is moveable between a clamped position for operatively engaging a portion of the cargo box and a released position for spacing the latch member from and placing the latch member out of operative engagement with the cargo box. The handle and the rod member are positioned in the channel in the clamp mechanism stowed position.

The present invention also provides a clamp mechanism including a handle and a block member with the handle and the block member having relative movement, and an elongate rod member coupled to the handle with the handle and the rod member having relative movement. The rod member is coupled to the block member and has angularly spaced depending and elevated positions relative to the block member. The clamp mechanism includes a latch member connected to the rod member and having clamped and released positions when the rod member is in the depending position. The latch member has a first spacing from the block member in the clamped position, and a second spacing from the block member in the released position with the second spacing being greater than the first spacing. Movement of the latch member between the clamped and released positions is urged by the relative movement between the handle and the rod member.

The present invention also provides a method of operating a clamp mechanism for clamping first and second objects together, including the steps of: positioning a block member of the clamp mechanism engaged with the first object to place the clamp mechanism in an operative position relative to the first object; pivotably moving a rod member of the clamp mechanism relative to the block member into a depending position relative to the block member and positioning a latch member of the clamp mechanism connected to the rod member to become operatively engaged with the second object; moving a handle of the clamp mechanism relative to the rod member and thereby moving the latch member towards the block member and into operative engagement with the second object; and drawing the first object and second object towards each other and into clamped engagement by shortening a distance between the block member and the latch member by rotatably moving the handle relative to the block member.

Accordingly, the present invention provides a rigid tonneau cover, which may be a folding cover having a substantially rigid panel as described above, and a clamp mechanism therefor that is both easy and reliable to operate. The clamp mechanism is easily adjusted to ensure the cover is properly positioned over the space, and retained to the cargo box. The clamp mechanism is held securely against its cover panel when in the stowed position.

BRIEF DESCRIPTION OF THE DRAWINGS

Other advantages of the present invention will be readily appreciated, as the same becomes better understood by reference to the following detailed description when considered in connection with the accompanying drawings, wherein:

FIG. 3A is a partially broken away bottom or interior plan view of the unfolded tonneau cover with the clamp mechanisms removed;

FIG. 3B is an enlarged view of a T-rail clamp track shown in FIG. 3A, showing the clamp opening cover secured over the T-rail clamp track opening at its laterally inboard end;

FIG. 3C is similar to FIG. 3B, but showing the clamp opening cover removed, revealing the T-rail clamp track opening;

FIG. 5 is an enlarged, partial cross-sectional view of the tonneau cover of FIG. 2B along line 5-5;

FIGS. 6A and 6B are orthogonal views of a T-rail clamp track;

FIG. 7 is an end view of T-rail clamp track support rail;

FIGS. 9A-9C are orthogonal views of a T-rail clamp track opening cover;

FIG. 10 is a partially cross-sectioned side view of an installed tonneau cover front clamp mechanism, showing its T-rail clamp track in cross section and its front clamp mechanism in an operational position engaging a truck cargo box side wall;

FIG. 11 is a cross-sectional view along line 11-11 of FIG. 10;

FIGS. 12A and 12B are orthogonal views of the front clamp mechanism wing nut;

FIGS. 13A, 13B, and 13D are orthogonal views of the front clamp mechanism block member;

FIG. 13C is a cross-sectional view along line 13C-13C of FIG. 13A;

FIGS. 14A and 14B are orthogonal views of the front clamp mechanism hook member;

FIG. 15 is a fragmented view similar to FIG. 10, but showing the front clamp mechanism in its stowed position;

FIG. 17 is a perspective view of the front clamp mechanism of FIG. 16 showing its clamp shaft in an elevated position relative to its block member;

FIG. 19 is a partially cross-sectioned side view of an installed tonneau cover rear clamp mechanism, showing its T-rail clamp track in cross section and its rear clamp mechanism in an operational position engaging a truck cargo box side wall, with its handle and clamp shaft angularly retained to each other;

FIG. 20 is a cross-sectional view along line 20-20 of FIG. 19;

FIGS. 24A and 24B are orthogonal views of the rear clamp mechanism handle;

FIGS. 24C and 24D are cross-sectional views respectively along lines 24C-24C and 24D-24D of FIG. 24B;

Figure 1:
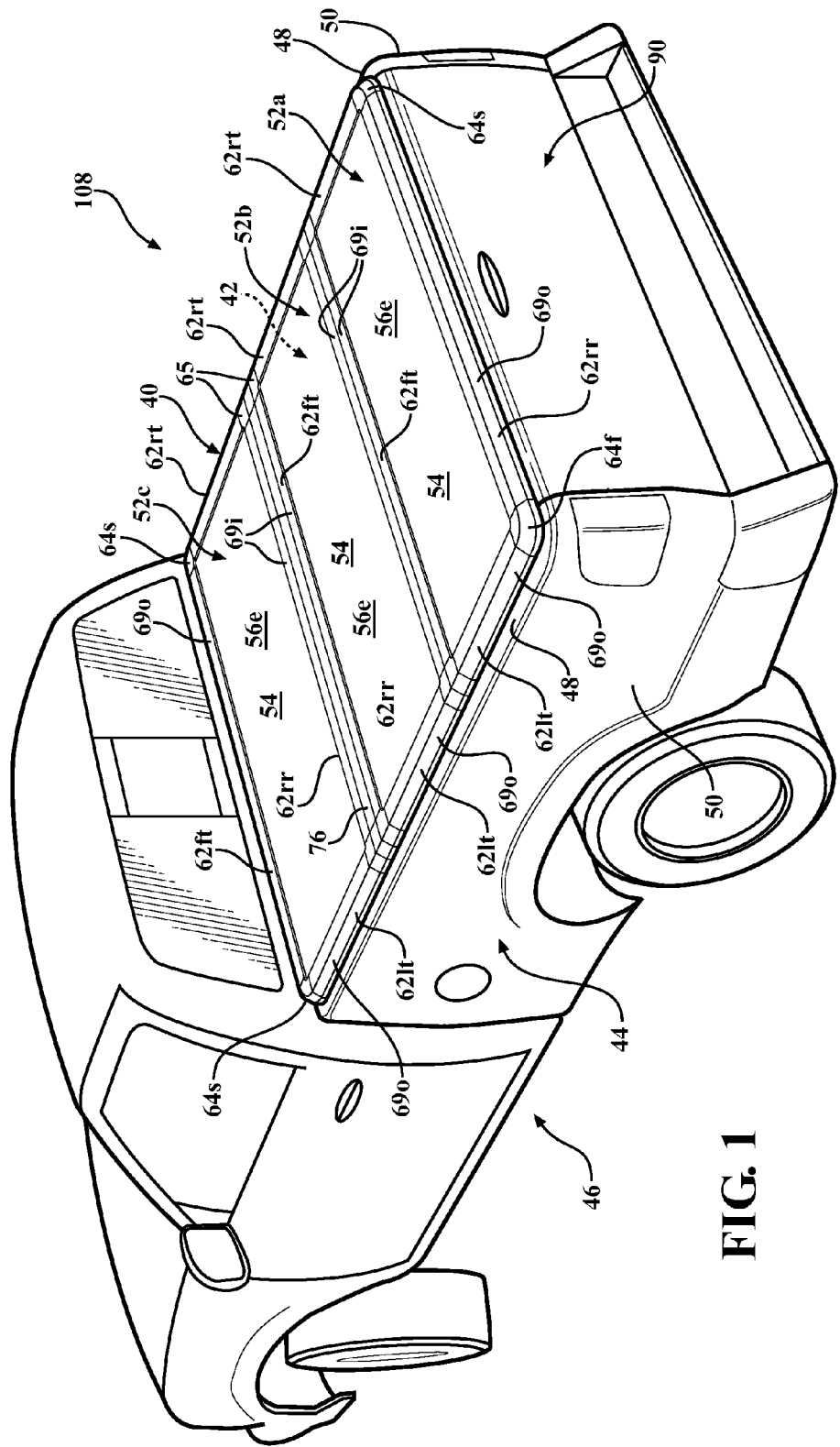
FIG. 1 is a perspective view of a folding, rigid tonneau cover in an unfolded condition, installed on a pick-up truck.

While the invention is susceptible to various modifications and alternative forms, a specific embodiment thereof is shown by way of example in the drawings and may herein be described in detail. It should be understood, however, that the drawings and detailed description herein are not intended to limit the invention to the particular form disclosed, but on the contrary, the intention is to cover all modifications, equivalents and alternatives falling within the spirit and scope of the present invention as defined by the appended claims.

Moreover, it is to be noted that the Figures are not necessarily drawn to scale or to the same scale. In particular, the scale of some of the elements of the Figures may be exaggerated to emphasize characteristics of the elements. Elements shown in more than one Figure that may be similarly configured have been indicated using the same reference numerals.

DETAILED DESCRIPTION OF EXEMPLARY EMBODIMENT(S)

Referring to the Figures, wherein like numerals indicate like or corresponding parts throughout the several views, a folding tonneau cover is generally shown at 40. The tonneau cover 40 is typically used to cover the space 42 within the cargo box or bed 44 of a pick-up truck 46.

Referring generally to FIG. 1, the tonneau cover 40 is disposed on the upper surfaces 48 of the upright walls 50 of the cargo box 44, and includes a plurality of individual rigid panels 52, each of substantially rectangular configuration. Panel $52_a$ is referred to herein as the first, rear, or tailgate-end panel; panel $52_b$ is referred to herein as the second or center panel; and panel $52_c$ is referred to herein as the third, front, or cab-end panel. Each of the panels $52_a$, $52_b$, $52_c$ includes a respective composite sheet member $54_a$, $54_b$, $54_c$. It is to be appreciated that each of the panels 52 includes at least one sheet member 54. Each sheet member 54 has a composite structure that is durable and lightweight, and imparts rigidity to the tonneau cover 40 and for protecting the space 42 within the cargo box 44. In the depicted embodiment, for example, each sheet member 54 includes an opposed pair of aluminum sheets $56_e$, $56_i$ respectively defining a portion of the tonneau cover top or exterior surface, and bottom or interior surface. Between aluminum sheets $56_e$, $56_i$ is a planar sheet of extruded polystyrene (XPS) foam forming the core 58 of sheet member 54. The interfacing surfaces of the core 58 and the aluminum sheets 56 are secured to each other with a suitable adhesive 60. The exposed surfaces of aluminum sheets 56 may be textured and/or colored.

Each panel 52 includes a plurality of extruded aluminum frame members 62 that bound its respective sheet member 54, and form a substantially rectangular periphery. Relative to each panel 52, and regardless of size or configuration, frame members $62_{lt}$ and $62_{rt}$ are respectively referred to herein as its left and right-side panel frame members that define opposite side edges of panel 52; frame member $62_{ft}$ is referred to herein as the front frame member that defines a front edge of panel 52; and frame member $62_{rr}$ is referred to herein as the rear frame member that defines a rear edge of panel 52. The corner between adjacent frame members 62 of each panel 52 is defined by a molded plastic, right angle connector member 64, through which the adjacent frame members 62 of that panel 52 are interconnected and affixed to each other. Relative to each respective panel $52_a$, $52_b$, $52_c$, left and right-side frame members $62_{lt}$ and $62_{rt}$ may be identical. Rear frame member $62_{rr}$ of first panel $52_a$ and front frame member $62_{ft}$ of third panel $52_c$ may be identical. Front frame member $62_{ft}$ of first panel $52_a$ and rear frame member $62_{rr}$ of third panel $52_c$ may be identical, and they may also be identical with both front $62_{ft}$ and rear $62_{rr}$ frame members of second panel $52_b$.

Figure 2A:
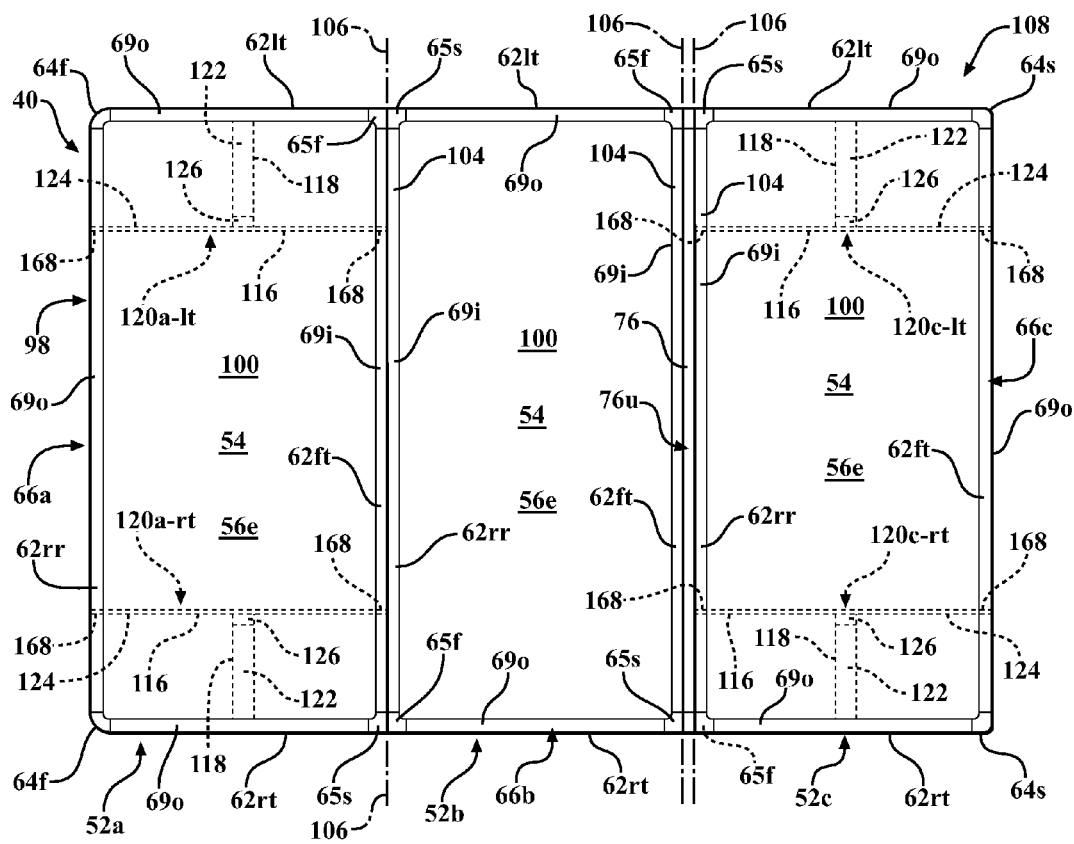
FIG. 2A is a top or exterior plan view of the unfolded tonneau cover, showing the T-rails of the front and rear panels in phantom lines, with the clamp mechanisms removed.

Referring to FIG. 2A, corner connectors $64_f$ and $64_s$ are respectively referred to herein as first and second outside corner connectors, and are respectively used only in first and third panels $52_a$ and $52_c$; and corner connectors $65_f$ and $65_s$ are respectively referred to herein as first and second inside corner connectors, and are used in panels $52_a$, $52_b$, and $52_c$. Panel $52_b$ uses only inside corner connectors 65. Notably, outside corner connectors $64_f$ and $64_s$ may differ (as shown) or be identical to each other, depending on whether the outside corner configurations between the tonneau cover at the front and rear differ or are common. Inside corner connectors $65_f$ and $65_s$ are minor images of each other. The joined frame members 62 and corner connectors 64, 65 define a rectangular perimeter frame $66_a$, $66_b$, $66_c$ of panels $52_a$, $52_b$, $52_c$, respectively. Each perimeter frame 66 defines an inwardly open circumferential C-channel 68 into which the outer peripheral edges 70 of the panel's respective sheet member 54 is received. The frame members 62 and connector members 64, 65 defining each C-channel 68 may optionally include elongate, circumferentially-extending ridges 72 in the perimeter frame 66 of each panel that are forced into, and locally displace, the XPS foam material of the core 58 during panel assembly, thereby providing a tortuous path along the frame-sheet member interface. Additionally, glue 74 is applied to the interfacing surfaces of the interior of C-channel 68 and the outer peripheral edges 70 of the sheet member 54, to secure the joint therebetween, the glued joint and tortuous path seals against water leaks through the opposite planar sides of the panels 52. Each composite sheet member 54 is substantially rigid. The frame members 62, which may be aluminum extrusions, also add rigidity and support to each of the panels 52. Respective to each perimeter frame 66, left $62_{lt}$ and right-side $62_{rt}$ frame members are identical and of an outside frame rail design $69_o$ having a first cross sectional configuration in a plane normal to its longitudinal axis. Rear frame member $62_{rr}$ of first panel perimeter frame $66_a$ and front frame member $62_{ft}$ of third panel perimeter frame $66_c$ are identical and also of outside frame rail design $69_o$. Respective to second panel perimeter frame $66_b$, the front $62_{ft}$ and rear $62_{rr}$ frame members are identical and of an inside frame rail design $69_i$ having a second cross section configuration in a plane normal to its longitudinal axis that differs from that of design $69_o$. Front frame member $62_{ft}$ of first panel perimeter frame $66_a$ and rear frame member $62_{rr}$ of third panel perimeter frame $66_c$ are identical and also of inside frame rail design $69_i$.

Between second, center panel $52_b$ and third, cab-end panel $52_c$ is disposed elongate, extruded aluminum spacer rail 76 having an endcap member 78 affixed to its opposite ends. The flat, bottom peripheral edge surface 80 of the tonneau cover 40, defined by frame members 62, corner connector members 64, 65, and the endcap members 78, is provided with compressible, closed-cell foam seal members 82 of rectangular cross-section that abuttingly interface the upper surfaces 48 of upright cargo box walls 50. The upward side surface 84 of each foam seal member 82 is affixed with adhesive 86 to the interfacing cover frame surface 80, thereby forming a tonneau cover peripheral seal 88 extending along the three edges of the rectangular cover frame periphery when the cover is unfolded, at the cover's left and right sides, and at its front end near the truck cab. The downward side surface 94 of foam seal members 82 abuttingly engage the upper peripheral edge surface 48 defined by the upright cargo box walls 50, and seal 88 is compressed between surfaces 48 and 80 where the cargo box 44 and the cover 40 are in clamped engagement. With cover 40 fully closed, seal 88 serves to seal space 42 against the elements, such as snow, water and dust, that might otherwise enter between tonneau cover peripheral surface 80 and cargo box wall upper surfaces 48. Seal 88, where and when compressed between surfaces 48 and 80, also serves as a resilient element that provides a reaction force against the clamping force, as occurs when the cover and cargo bed are in clamped engagement. In its compressed state, seal 88 forces surfaces 80 and 48 apart when the cover 40 and cargo box 44 are in clamped engagement, thereby facilitating the cover's tight fit to the cargo box.

The portion of cover bottom edge surface 80 defined by rear frame member $62_{rr}$ of first panel $52_a$, which interfaces the top edge of the pickup truck's closed tailgate 90, is similarly provided with multiple-lip seal 92 with which the tailgate top edge is slidably, sealably engageable.

Figure 2B:
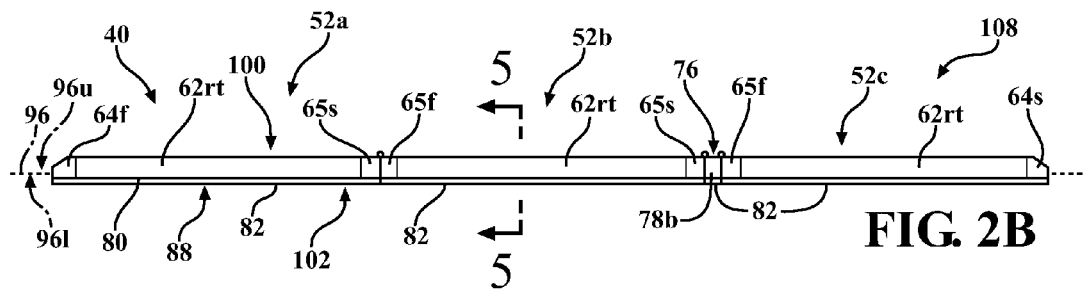
FIG. 2B is a side view of the unfolded tonneau cover.

The individual panels 52 and the spacer member 76 are arranged such that, when the tonneau cover 40 is unfolded, the panels 52 and the spacer member 76 are aligned, and substantially lie in a common, substantially horizontal imaginary plane 96 (FIG. 2B). Cover 40 defines a substantially rectangular tonneau cover periphery 98 having a length $L_c$ and a width $W_c$ (FIG. 3A). The width dimension $W_c$ of the tonneau cover 40, which extends laterally or between its opposite sides, is fixed. The length dimension $L_c$ of the tonneau cover 40, which extends in the longitudinal direction of the cover (i.e., between its front and rear, or between the truck cab and tailgate ends of the cargo area), is at a maximum when the cover is unfolded, and is varied with the hinged tonneau cover's differing states or stages of being unfolded and folded; length $L_c$ is at a minimum when fully folded, as shown in FIG. 2C.

Each panel 52 and spacer member 76, and tonneau cover 40 itself, has opposed first and second sides 100, 102, which respectively face exteriorly and interiorly relative to the cargo box 44 when tonneau cover 40 is unfolded, thereby enclosing the space 42 within cargo box 44. When cover 40 is unfolded, its first, exterior side 100 (which is substantially defined by the exposed surfaces of exterior aluminum sheets $56_e$ of the composite sheets 54, and upper surface $76_u$ of spacer member 76) generally faces in the direction normally away from exterior or upper side $96_u$ of substantially horizontal plane 96 (FIG. 2B); its second, interior side 102 (which is substantially defined by the exposed surfaces of interior aluminum sheets 56, of composite sheets 54, and lower surface $76_1$ of spacer member 76) generally faces in the direction normally away from interior or lower side $96_1$ of substantially horizontal plane 96.

Figure 4:
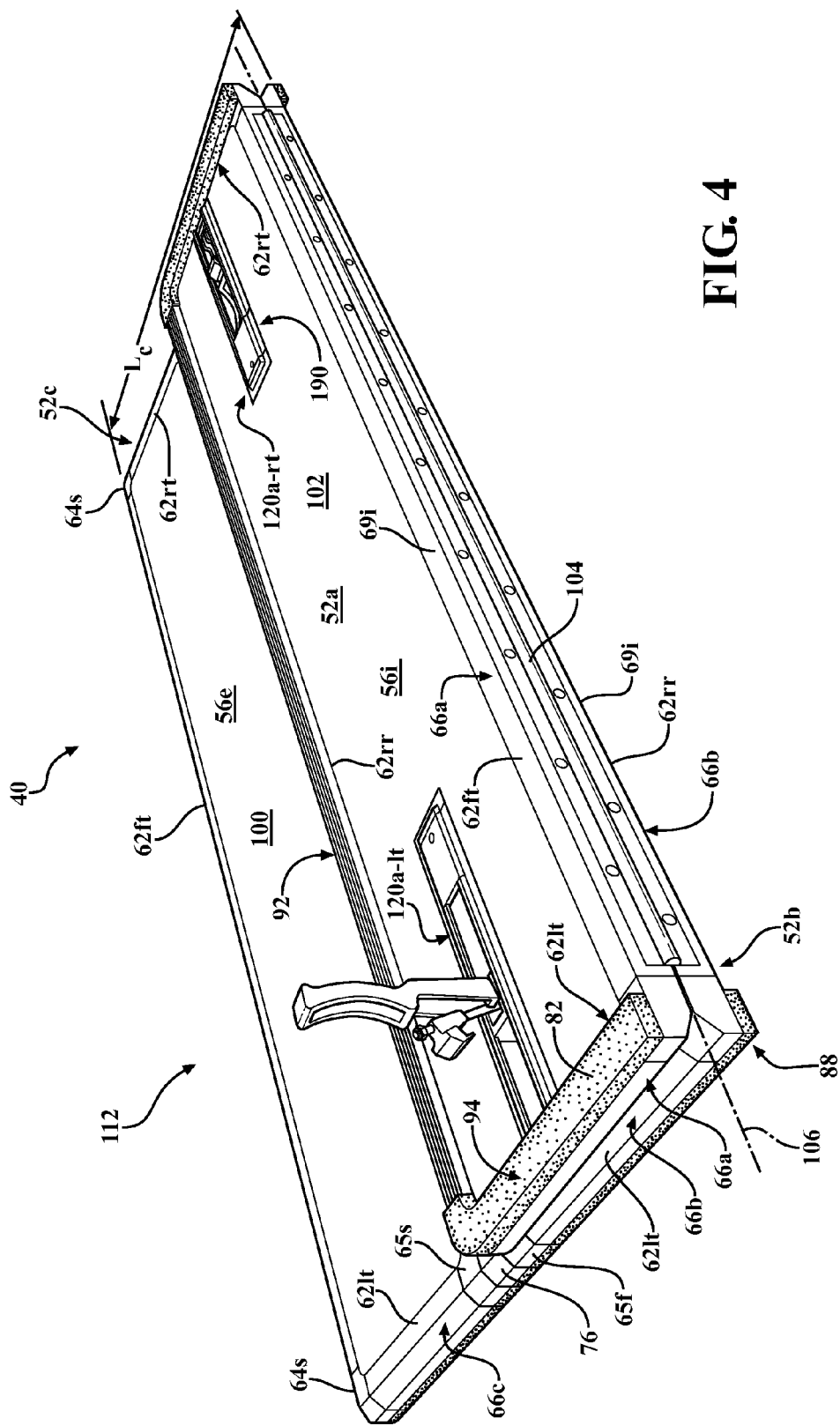
FIG. 4 is an upper or exterior perspective view of the tonneau cover of FIG. 1 in a partially folded condition with the first or rear or tailgate end panel folded onto the second or center panel, one clamp mechanism thereof shown in a stowed position, the other shown in an unstowed position.

As best shown in FIG. 4, the adjacent frame members $62_{ft}$ and $62_{rr}$ of panels $52_a$ and $52_b$, respectively, are pivotably joined by an elongate piano hinge 104 extending laterally relative to the cover 40, and preferably have a single or an interacting pair of seals (not shown) therebetween to prevent the ingress of water into covered space 42 between panels $52_a$, $52_b$ when the unfolded cover 40 is secured in place over the cargo box 44. The pivotably interconnected frame members $62_{ft}$ and $62_{rr}$ of panels $52_a$ and $52_b$, respectively, are both of internal rail design $69_i$. The frame members $62_{ft}$ and $62_{rr}$ of panels $52_b$ and $52_c$, respectively, are each pivotably joined by an elongate piano hinge 104 extending laterally relative to the cover 40, to opposite sides of interposed spacer member 76 and are each sealed, in a manner similar to that discussed above, to the opposed, interfacing sides of rail 76, to prevent water ingress to space 42 between panels $52_b$ or $52_c$ and spacer rail 76 when cover 40 is unfolded and closed.

Figure 2C:
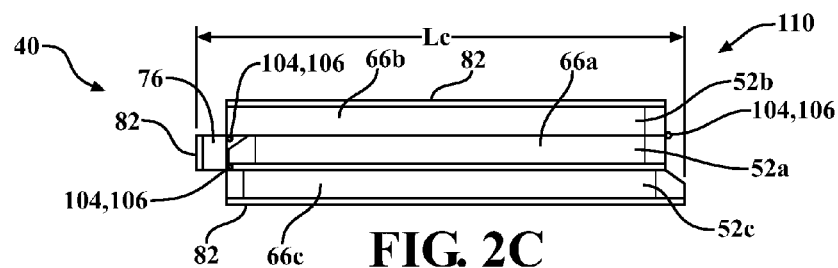
FIG. 2C is a side view of the tonneau cover in its fully folded condition.

The pivot axis 106 of each hinge 104 is disposed on the exterior or upper side $96_u$ of plane 96 when cover 40 is unfolded, such that cover 40 may fold onto itself, with panels $52_a$, $52_b$, $52_c$ superposed as shown in FIG. 2C. When the cover is in its fully folded state (FIG. 2C), spacer member 76 is oriented generally vertically over the thickness of first panel $52_a$ with its lower surface $76_1$ rearwardly exposed. Thus, the panels 52 and the spacer member 76 are operationally coupled to each other through a plurality of hinge assemblies 104 for moving between an unfolded state 108 (FIGS. 1-2B) and a fully folded state 110 (FIG. 2C), and have a partially folded state 112 therebetween (FIG. 4).

The particular means for hinging the panels 52 and spacer member 76, and the particular means for sealing between them, are unrelated to the present invention and may be by any practicable means known in the art, such as those disclosed in U.S. patent application Ser. No. 12/610,586 (U.S. Publication 2010/0109372 A1), the entire disclosure of which is expressly incorporated herein by reference.

Cover 40 includes a pair of T-shaped clamp support systems or T-rails 120 in each of panels $52_a$ and $52_c$, one T-rail 120 on each panel's left and right sides. In other words, cover 40 includes four identical T-rails 120, two in each of panels $52_a$ and $52_c$. Relative to each respective panel $52_a$ and $52_c$, its T-rails 120 are laterally spaced, relative to the cover, towards the opposite left and right sides of the panel, and are partially visible only on cover interior side 102. The T-rails 120 are completely hidden beneath the respective exterior aluminum sheet $56_e$ on cover exterior 100. The left and right side T-rails of panel $52_a$ are respectively identified as $120_{a-lt}$ and $120_{a-rt}$, and the left and right side T-rails of panel $52_c$ are respectively identified as $120_{c-lt}$ and $120_{c-rt}$.

Referring to FIG. 2A, it can be seen that each of the identical T-rails 120 includes a clamp track 122 and a clamp track support rail 124 interconnected through an intermediary clamp track end support 126. Clamp track 122 and clamp track support rail 124 are extruded aluminum members, and clamp track end support 126 is injection molded plastic. Clamp track 122 of each T-rail 120 extends from a right or left side frame member $62_{lt}$, $62_{rt}$ of the respective panel $52_a$, $52_c$ to its respective clamp track support rail 124. Relative to cover 40, clamp tracks 122 extend laterally (i.e., between the opposite sides of the cover), and clamp track support rails 124 extend longitudinally (i.e., between the cover front and rear ends). The support rails 124 are seated in cooperating slots 116 provided in, and extending through, the thickness of foam core sheet 58, and are covered by aluminum sheets $56_e$ and $56_i$ on both sides 100 and 102 of panel 52. Each support rail 124 extends substantially perpendicularly to the respective panel's front and rear frame members $62_{ft}$, $62_{rr}$, and its opposite ends 168 are disposed in the C-channels 68 thereof. Each clamp track 122 is located equidistantly between the respective front and rear frame members $62_{ft}$ and $62_{rr}$ of panels $52_a$ and $52_c$.

Referring to FIGS. 3A, 3B and 3C, it can be seen that clamp track 122 is received in cooperating slot 118 provided in, and extending through the thicknesses of, foam core sheet 58 and interior aluminum sheet $56_i$. Clamp track 122 includes an opposed pair of outwardly extending lateral flanges 128 that overlay interior aluminum sheet $56_i$. Clamp track 122 extends between its proximal end 130 located at, and received in its respective C-channel 68 of left or right side frame member $62_{lt}$ or $62_{rt}$, and its distal end 132 located near clamp track support rail 124. Between clamp track proximal and distal ends 130, 132 clamp track 122 has channel 134 defined by clamp track web 136, which abuts the underside of exterior aluminum sheet $56_e$, and opposed side walls 138 separated by and extending from web 136. At the ends of side walls 138 opposite the track floor of web 136, clamp track 122 has inwardly extending lateral flanges 140 which partially enclose channel 134. Flanges 140 have elongate, interfacing edges that define a slot 142 in clamp track 122. Slot 142 provides an elongate, continuous opening between cover interior side 102 and channel 134. Near distal end 132 of each clamp track 122, inwardly extending lateral flanges 140 are removed to define a closeable opening 144 into channel 134.

Referring to FIG. 3B, a cover plate 146 is fitted into opening 144, and is secured to clamp track 122 and clamp track end support 126. Channel 134 is open to cover interior side 102 through opening 144 when cover plate 146 is removed.

Figure 8A:
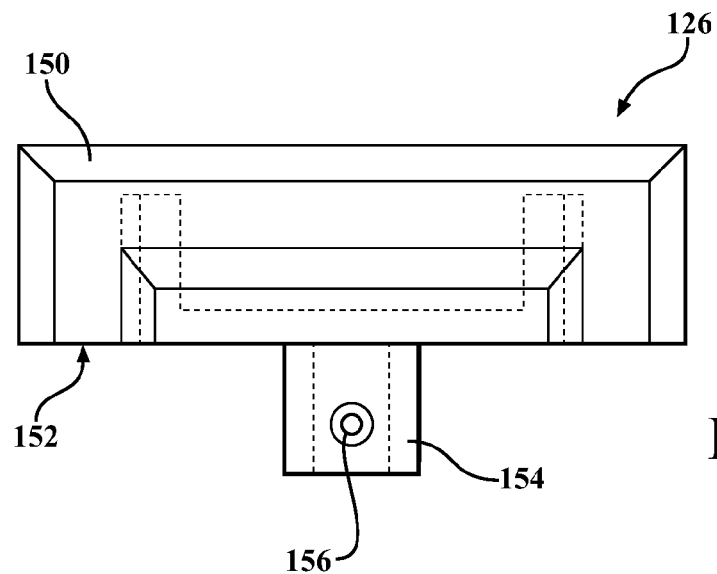
FIGS. 8A-8C are orthogonal views of a T-rail clamp track end support.
Figure 8B:
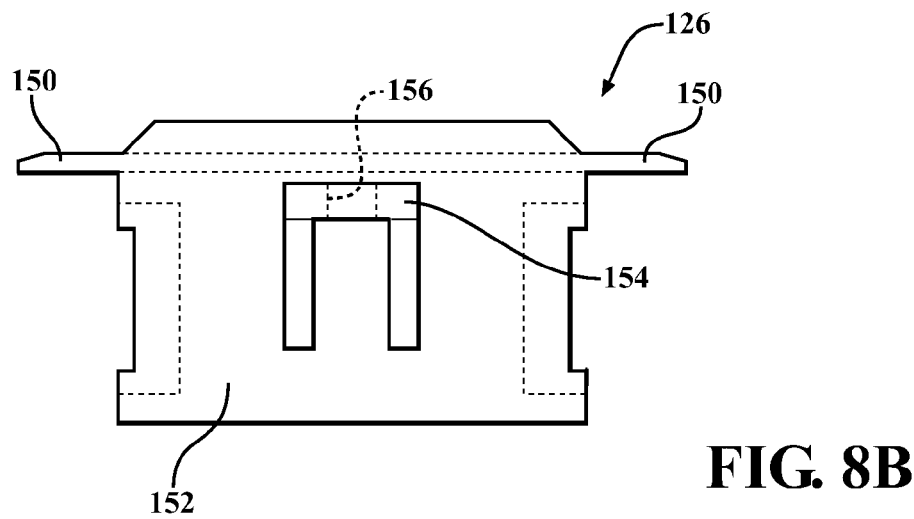
Figure 8C:
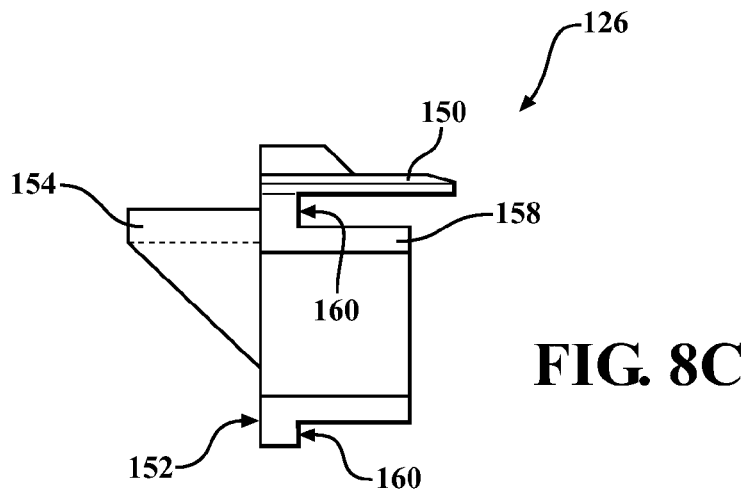

Clamp track end support 126, which is shown in FIGS. 8A, 8B, and 8C, has flange 150 extending peripherally in directions away from opening 144, and overlies the end of slot 118 in aluminum sheet $56_i$, and a planar first surface 152 that abuts clamp track distal end surface 153 (FIG. 6B) and defines an end wall of channel 134 and its opening 144. Unitary clamp track end support 126 includes a screw boss 154 projecting from first surface 152 into clamp track channel opening 144. Screw boss 154 supports cover plate 146 and is provided with a hole 156 into which is threadedly received a screw for retaining cover plate 146 to the T-rail 120. Clamp track end support 126 further includes parallelepiped bearing portion 158 projecting from a second surface 160 that is opposed to and parallel with first surface 152. Bearing portion 158 is received in an outwardly open recess 162, such as a laterally open C-channel, defined in clamp track support rail 124 (FIG. 7).

The C-channel 162 of depicted clamp track support rail 124 is defined by a pair of legs 164 between which extends web 166. The overall height of web 166 is substantially equal to the thickness of foam core 58, and legs 164 lie along the interfacing underside surfaces of aluminum sheets $56_e$, $56_i$. The terminal ends of legs 164 opposite web 166 abut second surface 160 of clamp track end support 126, as best shown in FIGS. 15 and 21-23.

Referring to FIGS. 9A, 9B and 9C, cover plate 146 is a substantially planar, rectangular member having opposite first 170 and second 172 ends. A pair of bosses 174 project from first end 170. A countersunk hole 176 is provided through the thickness of the planar cover near its second end 172. Cover plate 146 includes opposite lateral sides 178 that are received between clamp track side walls 138 in opening 144, with each lateral side 178 having an overhanging lip 180 that supports cover plate 146 against the machined surfaces of the clamp track 122 that result from removal of inwardly extending lateral flanges 140 when forming opening 144. Bosses 174 extend into channel 134 and are supported by coves 182 (FIGS. 6A and 6B) defined by the clamp track side walls 138 and the interior surfaces of its inwardly projecting lateral flanges 140. Cover first end 170 has an abutting relationship with clamp track shoulders 184 (FIG. 6B) that result from removal of portions of the inwardly lateral flanges 140 and which define portions of clamp track opening 144. Referring back to FIG. 3B, screw 186 extends through countersunk hole 176 in cover plate 146, and is threadedly received in screw boss hole 156 of clamp track end support 126. Referring again to FIGS. 15 and 21-23, it can be seen that with cover plate 146 installed to close opening 144, a pocket 188 is defined at the distal end 132 of clamp track 122, in which the handle of its respective clamp mechanism is receivable, and is retained in the clamp mechanism stowed position 190.

Cover assembly 40 includes a clamp mechanism 200 or 300 is slidably coupled to each T-rail 120, and interengages the cover assembly 40 and cargo box 44 for securing the cover over the space 42. In other words, one clamp mechanism is slidably disposed in a T-rail channel 134 at each of the left and right lateral sides of panels $52_a$ and $52_c$.

Referring to FIGS. 10-18, there is shown front, or cab-end clamp mechanism 200, one of which is provided in each of T-rails $120_{c-lt}$ and $120_{c-rt}$; the respective clamp mechanisms 200 are identified as $200_{c-lt}$ and $200_{c-rt}$. Each front clamp mechanism 200 includes an injection molded plastic block member 202 that is slidably disposed in clamp track channel 134, the block member 202 and channel 134 having cooperating cross-sectional outlines as shown in FIG. 11. As a part of assembled clamp mechanism 200, block member 202 is inserted into channel 134 through opening 144, which is subsequently closed by the installation of cover plate 146 as described above. Front clamp mechanism 200 further includes elongate handle assembly 204 pivotably attached to and extending from block member 202. Handle assembly 204 includes threaded rod member 206 to which is threadedly attached handle 208 which also serves as a wing nut. Hook member or latch member 210 is disposed about rod member 206 between handle or wing nut 208 and block member 202. Threadedly attached to the end of rod member 206 opposite handle 208 is cylindrical pivot member or trunnion 212, which is received in U-shaped trunnion recess 214 of block member 202; the open end of U-shaped recess 214 is closed by channel floor 136 of clamp track 122. Clamp mechanism 200 further includes a stop mechanism that includes elongate lock bar 216 that lies across slot 142 outside of channel 134 and engages the exposed surfaces of clamp track inwardly extending lateral flanges 140. Lock bar 216 includes a pair of clearance holes 218 located between the sides of slot 142; a pair of screws 220 extend into holes 218. Screws 220 extend past inwardly extending lateral flanges 140 of the clamp track and through a pair of clearance holes 222 provided in block member 202. The threaded ends of screws 220 are received into a nut 224 of the stop mechanism in the form of a bar that is carried by block member 202 and having a corresponding pair of threaded holes 226 aligned with block member holes 222. The block member 202 is thus engaged with the stop mechanism to define, when the stop mechanism is secured to the clamp track, a clamp mechanism position along the channel.

Block member 202 is provided with a centrally located slot 228 that is vertical in its installed orientation, and extends to the center of U-shaped trunnion recess 214 and through one wall thereof. Slot 228 receives a portion of threaded rod member 206 proximate to pivot member or trunnion 212.

Referring to FIGS. 14A and 14B, injection molded plastic hook member or latch 210 is provided with hook portion 232 and a clearance hole 230 through which threaded rod member 206 extends. As shown in FIG. 10, clamp mechanism 200 has an operative position 234 along channel 134 in which hook portion 232 can be oriented to engage interior lip 238 of cargo box 44. In the operative position 232, the hook member or latch 210 of each clamp mechanism 200 is forced upwardly into abutting engagement with interior cargo box lip 238 through the tightening of its wing nut 208, which has a threaded hole 240 into which the threaded terminal end of threaded rod member 206 is received. Referring to FIGS. 12A and 12B, handle or wing nut 208 has a plurality of wings 242 to facilitate manually turning it, and an annular recess 244 concentrically disposed about threaded hole 240 in the axial end of the handle or wing nut that interfaces latch 210. Seated in recess 244 is lock washer 246 that operatively engages the bottom of recess 244 and the interfacing surface of latch 210 to prevent the handle or wing nut 208 from becoming loosened when in its operative position and clamping panel $52_c$ to the cargo bed 44. With clamp mechanisms 200 clamping panel $52_c$ to the cargo box 44, the foam seal member 82 shown in FIG. 10 is elastically compressed to provide a seal between the bottom surface 80 of perimeter frame $66_c$ and the upper surface 48 of the upright walls 50 of the cargo box and react against the compressing force exerted through the clamp mechanism 200 when the cargo box and at least panel $52_c$ of the cover are in clamped engagement. FIGS. 10 and 11 show a front clamp mechanism 200 in its operative position, near proximate end 130 of its respective clamp track 122. The clamp mechanism 200 is held in its position along the clamp track 122 by tightening screws 220 which, as best seen in FIG. 11, clamp the inwardly extending lateral flanges 140 of the clamp track between bar 216 and the bottom surface of the block member 202. The cover 40 thus exhibits no tendency to shift laterally (i.e., sideways) nor longitudinally (i.e., between its front and rear ends) when at least panel $52_c$ of cover 40 is in clamped engagement with cargo box 44.

Figure 16:
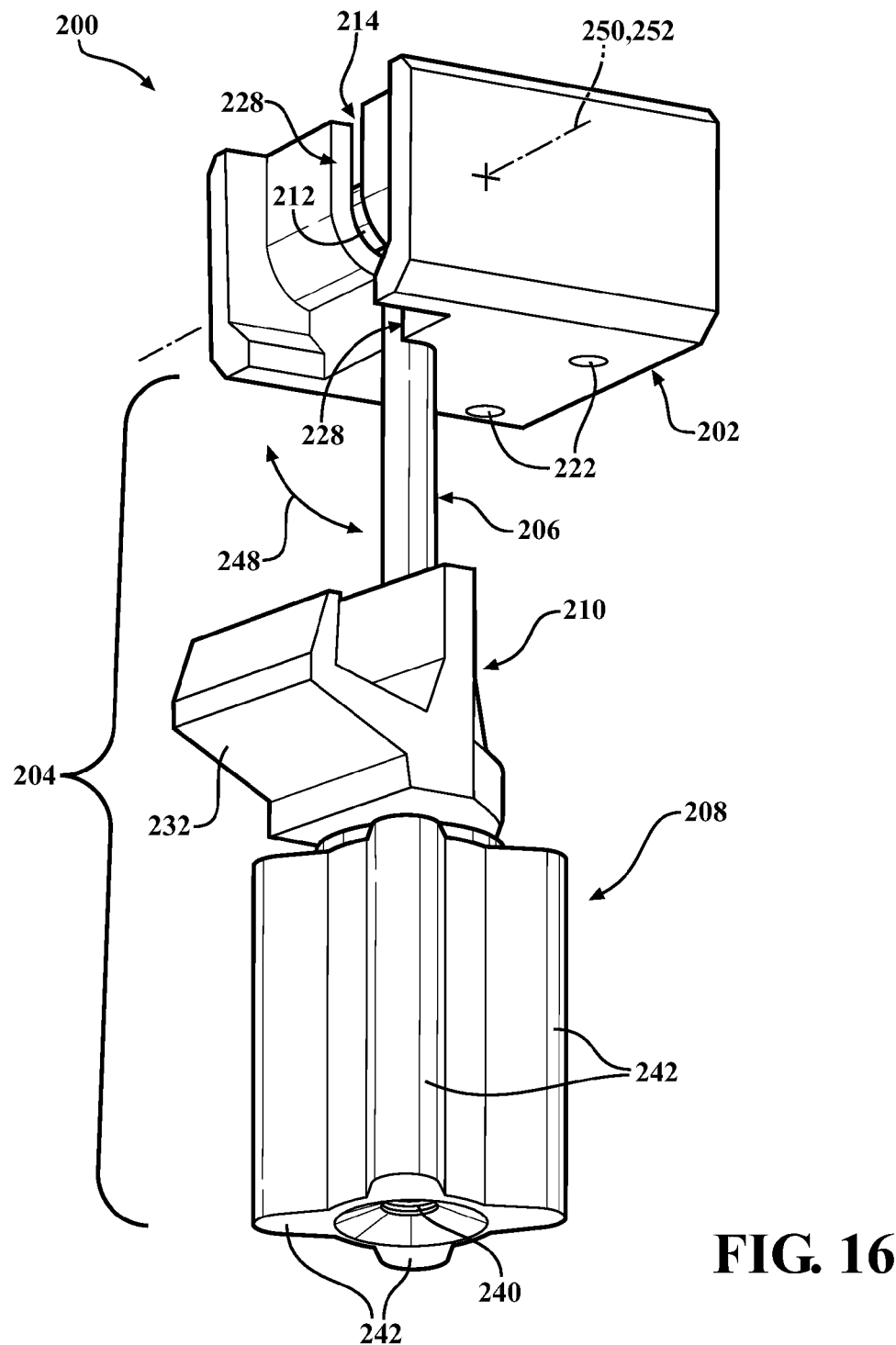
FIG. 16 is a perspective view of a front clamp mechanism showing its clamp shaft in a depending position relative to its block member.
Figure 18:
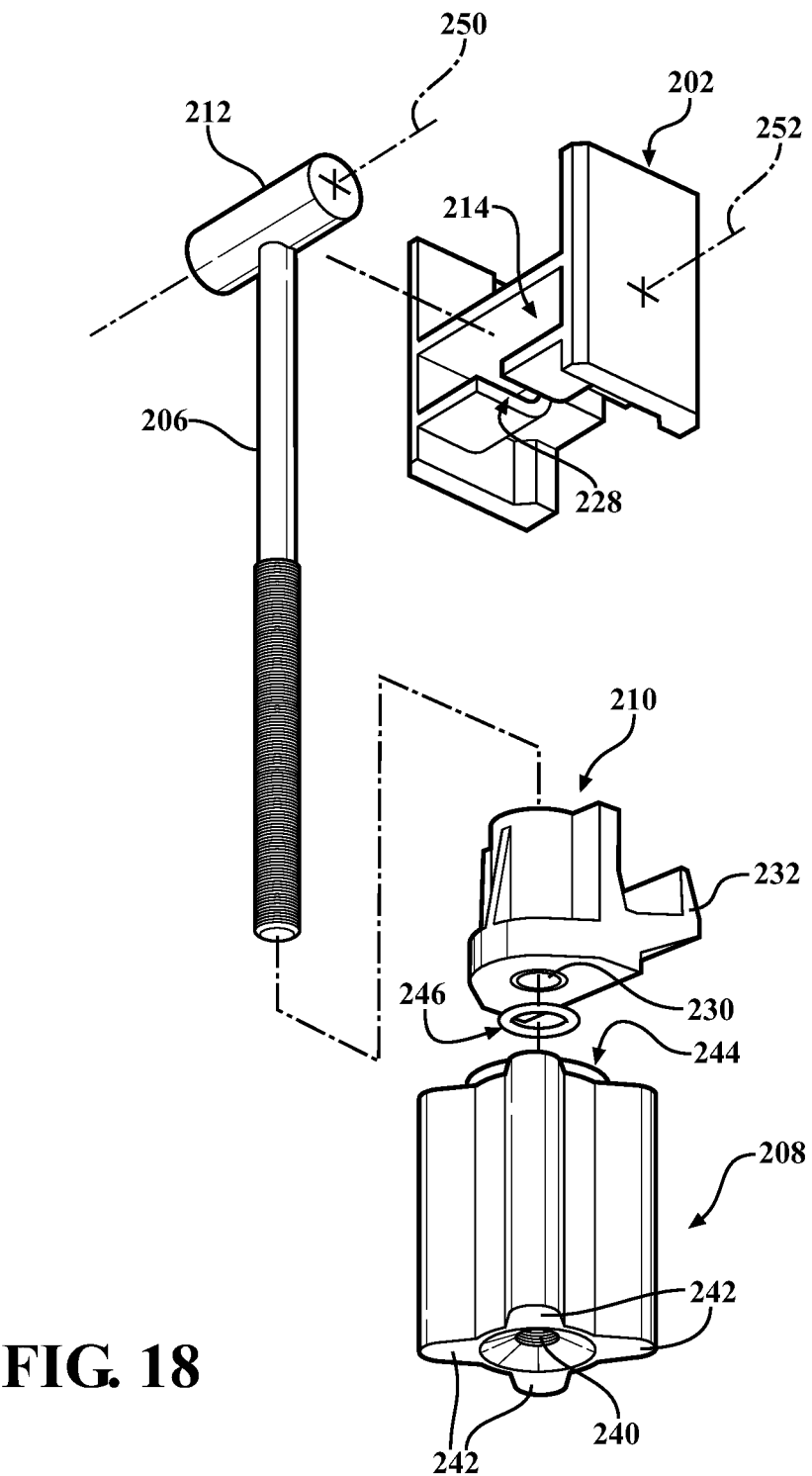
FIG. 18 is an exploded perspective view of the front clamp mechanism of FIG. 16.

Referring to FIGS. 16 and 17, it can be seen that the threaded rod member 206 has rotatable or pivoting motion relative to the block member 202 in directions indicated by arrow 248 between its depending position (FIG. 16) and an angularly spaced elevated position (FIG. 17), the rod member 206 moving within slot 228 between its depending and elevated positions, respectively. In moving between these positions, which are maximally spaced at approximately 90°, the handle assembly 204 is rotated or pivoted in the directions of arrow 248 about pivot axis 250 of trunnion 212. Pivot axis 250 of trunnion 212 is, when clamp mechanism 200 is assembled, preferably co-linear with axis 252 of U-shaped trunnion recess 214.

Notably, with reference to FIG. 17, block member 202 has an orientation in channel 134 that allows handle assembly 204 to be moved into an elevated position that permits it to be disposed in channel 134, with rod member 206 and handle 208 oriented towards clamp track distal end 132. So disposed, the clamp mechanism 200 may be slid along channel 134 such that handle 208 is received in pocket 188. Screws 220 may then be tightened to securely store handle assembly 204 against cover 40 in a stowed position 190 in which it is prevented from moving out of its elevated position, contained within channel 134, to a position in which it extends from channel 134 and may interfere with, be damaged by, or do damage to, anything when cover 40 is not installed on a cargo box 44.

The orientation of block member 202 in channel 134 may, but need not in all cases, be reversed to better facilitate positioning of the latch portion 210 relative to cargo box lip 238 for installation, as shown in FIGS. 10 and 11. Notably, once cover 40 is installed on a cargo box 44, its front clamp mechanisms $200_{c-lt}$ and $200_{c-rt}$ remain in their operative positions 234, and hook portions 232, brought into operative engagement with cargo box interior lips 238 through the tightening of handles or wing nuts 208, securely hold the cover 40 to the bed 44. Therefore, once block member 202 is reoriented from its stowing configuration in channel 134, the front clamp mechanism can be left in its shown operative position 234 at all times while cover 40 is installed on the cargo box 44.

Referring to FIGS. 19-31, cover assembly 40 includes rear, or tailgate-end clamp mechanism 300, one of which is provided in each of T-rails $120_{a-lt}$ and $120_{a-rt}$; the respective clamp mechanisms 300 are identified as $300_{a-lt}$ and $300_{a-rt}$. Elements of clamp mechanism 300 that correspond to above-identified elements of clamp mechanism 200 have like second and third reference numeral digits preceded by a "3" instead of a "2". Each front clamp mechanism 300 includes an injection molded plastic block member 302 that is slidably disposed in clamp track channel 134, the block member 302 and channel 134 having cooperating cross-sectional outlines, as shown in FIG. 20. As a part of assembled clamp mechanism 300, unitary block member 302 is inserted into channel 134 through opening 144, which is subsequently closed by the installation of cover plate 146 as described above.

Rear clamp mechanism 300 further includes elongate, unitary injection molded plastic handle 304 and threaded rod member 306, each pivotably or rotatably attached to each other and extending from block member 302. Handle 304 and rod member 306 are also both pivotably or rotatably attached to block member 302 and extend through slot 142. Threadedly attached to rod member 306 is jam nut 308. Injection molded plastic hook member or latch member 310 is threadedly received onto rod member 306 between jam nut 308 and block member 302. Threadedly attached to the end of rod member 306 opposite jam nut 308 is cylindrical pivot member or trunnion 312, the opposite axial ends of which are slidably received in a pair of laterally aligned U-shaped trunnion-bearing recesses or slots 314 of block member 302, the open ends of the pair of U-shaped slots 314 closed by channel floor 136 of clamp track 122.

Cover 40 preferably includes a stop mechanism 388 that works with but is separable from the clamp mechanism 300. The stop mechanism 388 includes elongate lock bar 316 which lies across slot 142 outside of channel 134, and engages the exposed surfaces of clamp track inwardly extending lateral flanges 140 between clamp track proximate end 130 and block member 302. Lock bar 316 includes a pair of clearance holes 318 located between the sides of slot 142. The stop mechanism 388 also includes a pair of screws 320 that extend through holes 318 from cover interior side 102. Screws 320 extend past inwardly extending lateral flanges 140 of the clamp track, and their threaded ends are received into a nut 324 of the stop mechanism 388, which is in the form of an elongate stop bar that is desirably positioned along clamp track 122 inside of channel 134. Stop bar or nut 324 has a corresponding pair of threaded holes 326 aligned with lock bar holes 318. With the tightening of screws 320, the lock bar 316 and stop bar 324 are clamped onto flanges 140, at a location along slot 142 that is selected to provide a stop against which block member 302 abuts when the clamp mechanism 300 is slid laterally outwardly of the cover 40, along clamp track channel 134 and towards clamp track proximate end 130. The block member 302 is thus engaged with the stop mechanism 388 to define, when the stop mechanism is secured to the clamp track, a clamp mechanism position along the channel. Clamp mechanism 300 is in its operative position 334 when block member 302 is abutting stop bar 324 of stop mechanism 388. In operative position 334, with rod member 306 depending from block member 302, hook member or latch 310 is oriented to become operatively engaged with cargo box interior lip 238. With latch 310 so positioned, handle 304 is manipulated to operatively engage lip 238 and clamp panel $52_a$ of cover 40 to the cargo box 44, thereby locking the unfolded cover assembly 40 against upper surfaces 48 of the cargo box walls 50 and the top edge of the closed tailgate 90. With panel $52_a$ clamped, it cannot be lifted away from surfaces 48 or tailgate 90; therefore, with cover 40 secured and the tailgate 90 closed and locked, the contents of enclosed space 42 cannot be viewed or accessed.

Figure 25A:
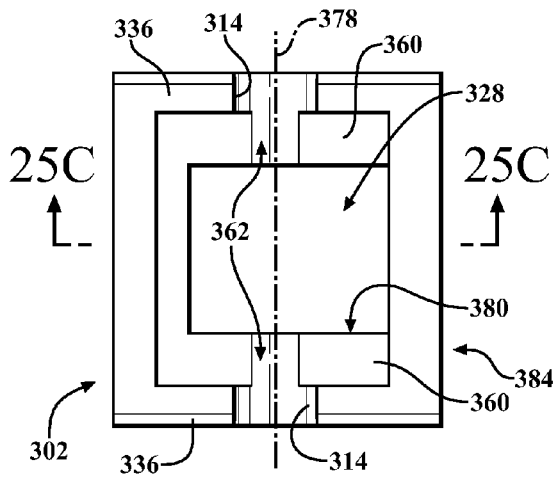
FIGS. 25A and 25B are orthogonal views of the rear clamp mechanism block member.
Figure 25B:
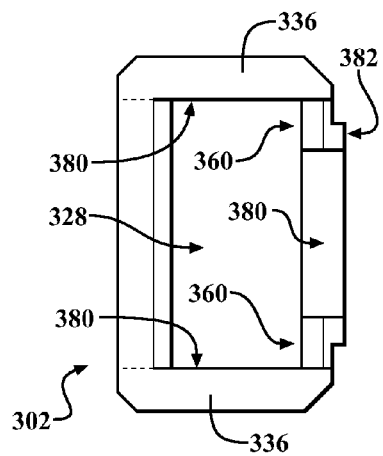
Figure 25C:
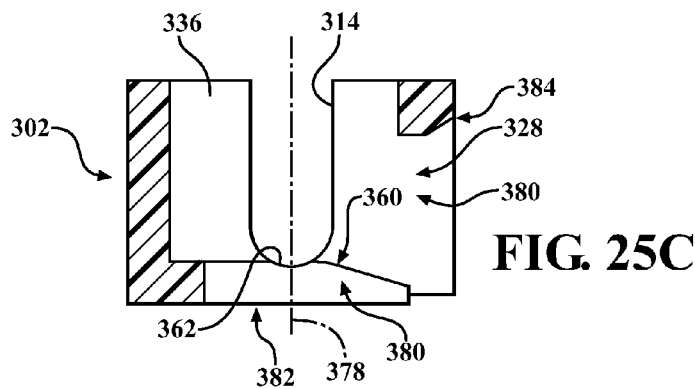
FIG. 25C is a cross-sectional view along line 25C-25C of FIG. 25A

Referring to FIGS. 25A-25C, block member 302 is generally hollow, and provided with a central void or cavity 328 defined between a pair of opposite side walls 336 of the block member 302, in which the above-mentioned laterally aligned pair of U-shaped trunnion slots 314 is provided. Void 328 contains the portion of threaded rod member 306 and the end of handle 304 that are proximate to pivot member or trunnion 312. Trunnion 312 is rotatably retained in a C-shaped recess 354 formed in the handle end, and is carried by the handle therein. Threaded rod member 306 is carried by trunnion 312.

Figure 26A:
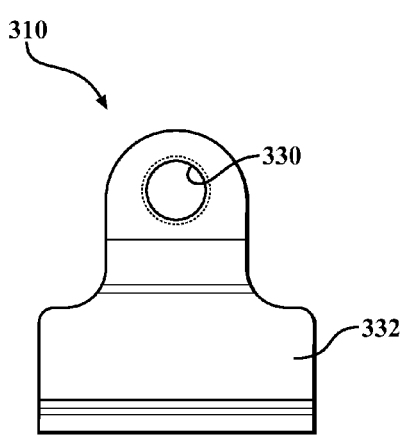
FIGS. 26A and 26B are orthogonal views of the rear clamp mechanism hook member.
Figure 26B:
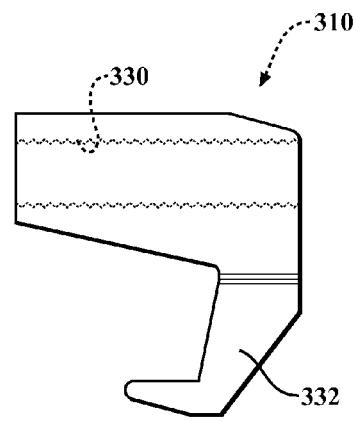
Figure 27:
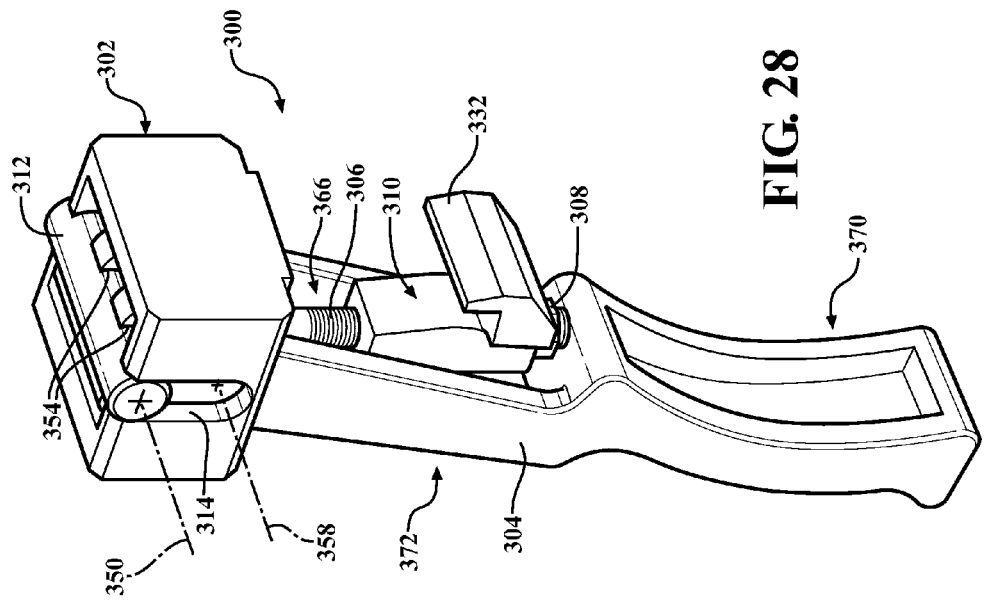
FIG. 27 is a perspective view of a rear clamp mechanism showing its clamp shaft and handle in depending positions relative to its block member, the handle and clamp shaft angularly retained to each other.
Figure 28:
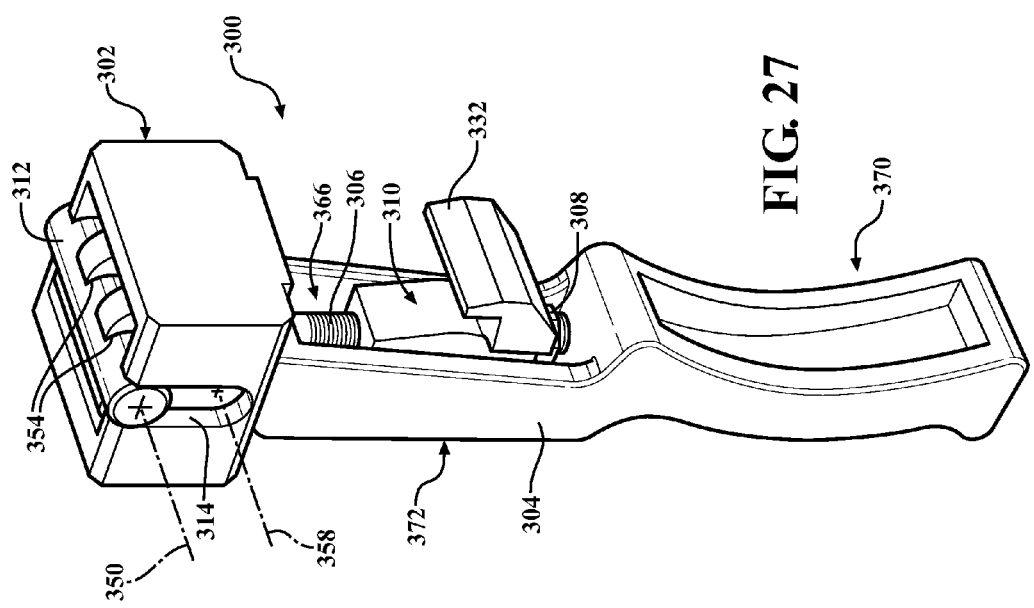
FIG. 28 is a view similar to FIG. 27, but showing the handle and clamp shaft angularly unretained to each other.
Figure 29:
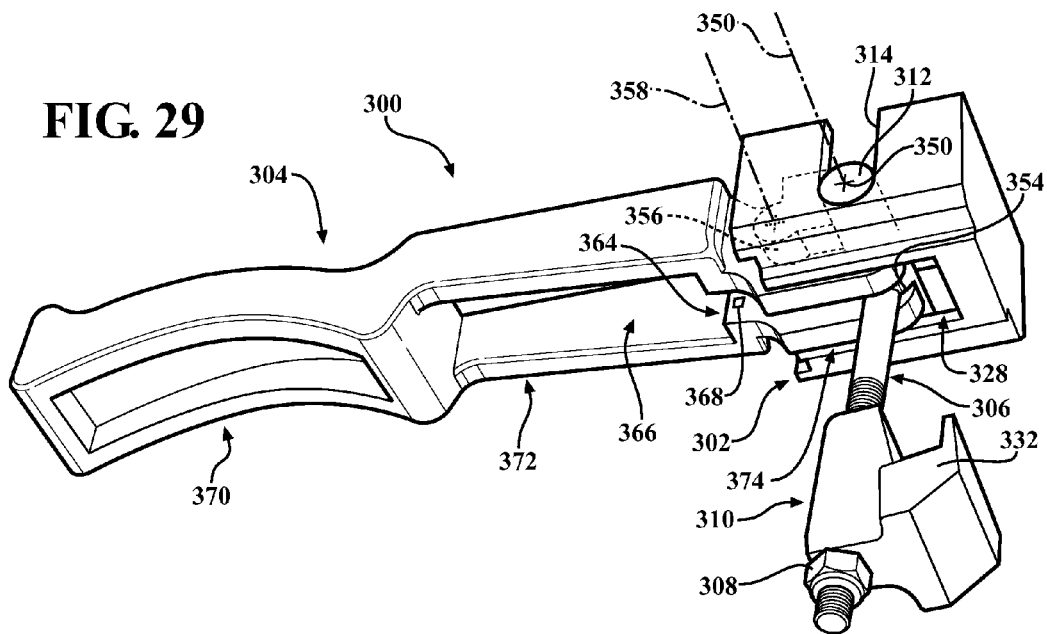
FIG. 29 is a perspective view of the rear clamp mechanism showing the handle in an elevated position and the clamp shaft in a depending position, relative to the block member.
Figure 30:
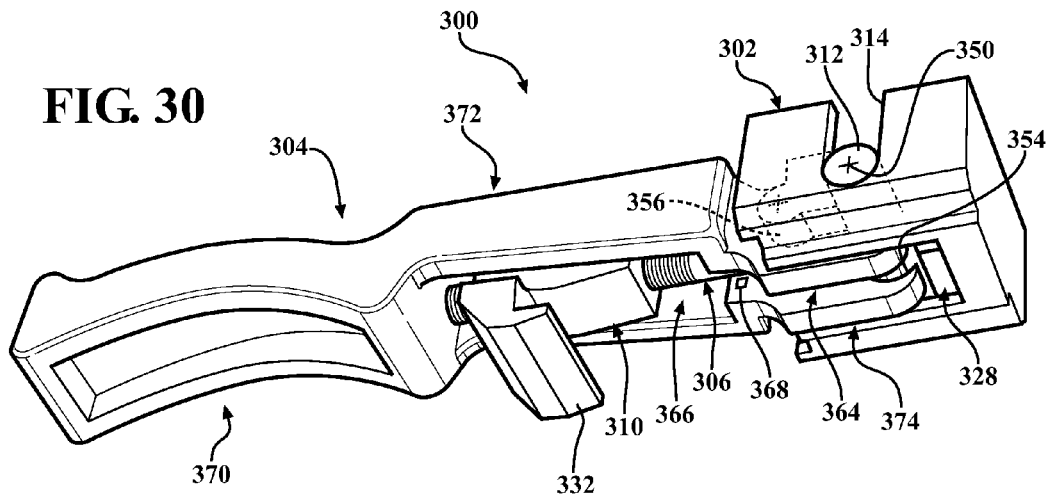
FIG. 30 is a perspective view of the rear clamp mechanism showing the handle and clamp shaft angularly retained to each other and in an elevated position relative to the block member.
Figure 31:
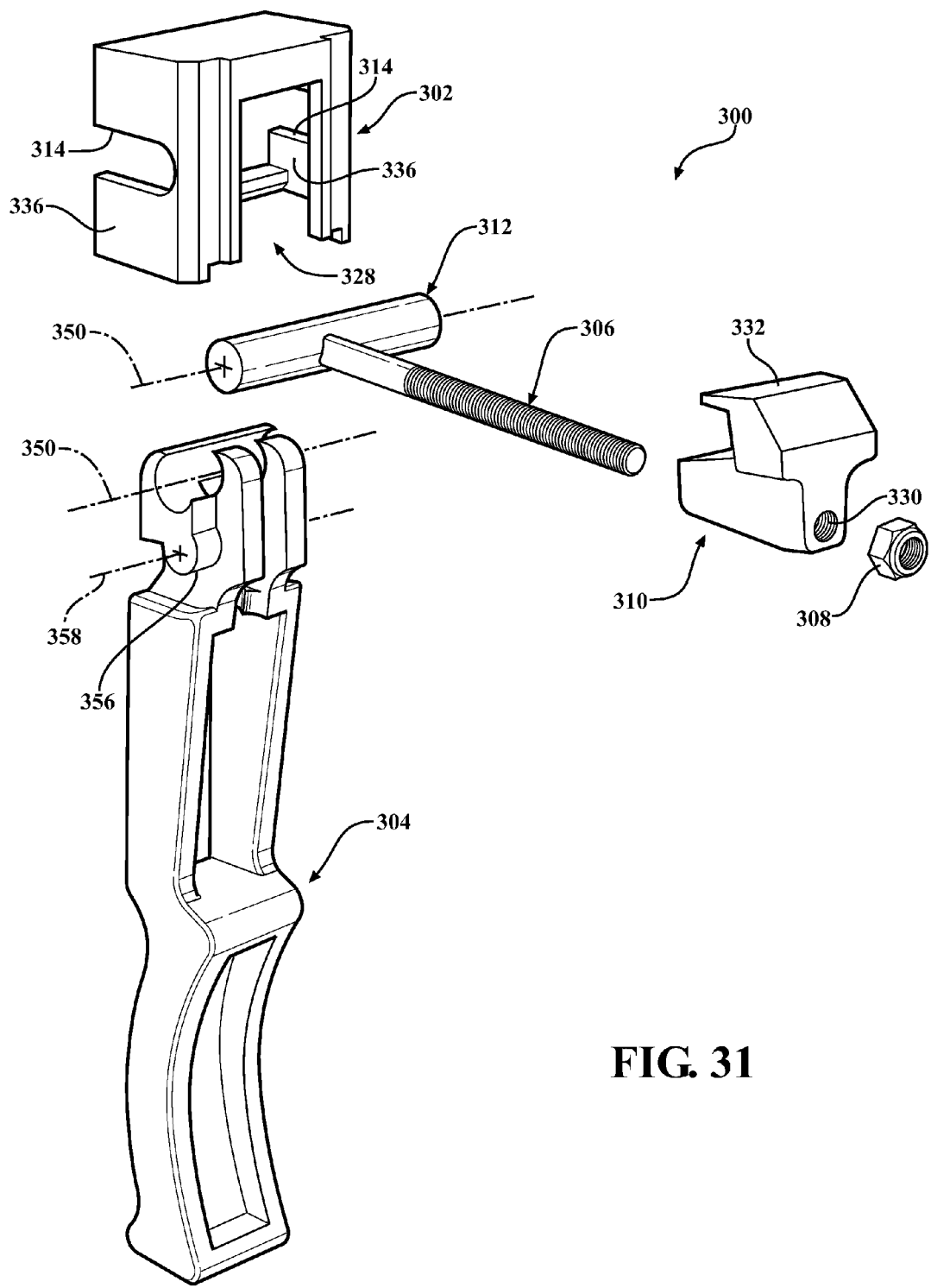
FIG. 31 is an exploded perspective view of the rear clamp mechanism of FIG. 27.

Referring to FIGS. 26A and 26B, hook member or latch 310 is provided with hook portion 332 and a threaded hole 330 through which threaded rod member 306 extends. The position of latch 310 along rod 306 is selected by relatively rotating the latch 310 and the rod 306, to achieve the desired clamping force. Jam nut 308 is then tightened against latch 310 to hold the desired latch position relative to the rod member 306. As shown in FIG. 19, clamp mechanism 300 has an operative position 334 in which hook member 310 may be oriented to operatively engage interior lip 238 of cargo box 44. In the operating position 334 of clamp mechanism 300, the hook member or latch 310 is lifted upwardly to place hook portion 332 into a partially surrounding relationship and abutting engagement with interior cargo box lip 238, through the downward rotation of handle 304, which lifts the pivot member or trunnion 312 upwardly away from lip 238, which thereby brings the hook portion 332 into clamping engagement with lip 238.

Referring to FIGS. 24A through 24D, C-shaped, cylindrical recess 354 defined at one end of handle 304 is centered on pivot axis 350, about which trunnion 312 and handle 304 have relative rotation. Handle 304 includes integrally-formed curved bearing surfaces 356 that project in opposite directions from the lateral sides of handle 304 proximate to, but separated from, axis 350. Bearing surfaces 356 are semi-cylindrical and extend coaxially along bearing axis 358, which is spaced from and parallel to axis 350, a distance that places the axially opposite ends of the cylindrical bearing surfaces 356 proximate to the inner surfaces of block member side walls 336 within void 328; thus, the cylindrical bearing surfaces 356 extend axially along axis 358 a shorter distance than trunnion 312 does along axis 350, the axial ends of pivot member 312 being disposed in the block member side walls' U-shaped trunnion slots 314. Axes 350 and 358 lie in a common imaginary plane fixed relative to handle 304.

Referring again to FIGS. 25A through 25C, block member 302 includes a pair of bearing surfaces 360 that extend inwardly from side walls 336 and partially define void 328. Cylindrical bearing surfaces 356 are slidably engageable with bearing surfaces 360. These bearing surfaces 360 are spaced apart to partially define an opening 380 through walls 382 and 384 of block member 302, through which handle 304 extends and is moveable between angularly spaced elevated and depending positions relative to the block member 302, which are maximally spaced at approximately 90°. Bearing surfaces 360 are provided with shallow, cylindrical detents 362 that are flush with the ends of U-shaped trunnion slots 314 provided in sidewalls 336. With axes 350 and 358 lying in a common imaginary plane that substantially extends along U-shaped trunnion slots 314, the cylindrical bearing surfaces 356 are seated in cylindrical detents 362, as shown in FIG. 19. Detents 362 may be optionally positioned along surfaces 360 to over-center clamp mechanism 300 in its clamped position, placing bearing axis 358 slightly laterally outboard of pivot axis 350.

Referring back to FIGS. 24A through 24D, handle 304 is provided with an elongate slot 364 that extends between C-shaped recess 354 and a large oblong opening 366 that extends through the handle 304. In the stowed position 190 and clamped position 386 of clamp mechanisms 300, the oblong opening 366 contains the hook member or latch 310, with threaded rod member 306 extending through slot 364. Slot 364 is provided with an opposed pair of retaining bosses 368 that extend from the sidewalls of slot 364 towards each other. The terminal ends of the interfacing retaining bosses 368 are spaced from each other across slot 364 by a distance that is slightly less than the diameter of threaded rod member 306, and from the floor of slot 364 by at least one half the diameter of rod 306. With threaded rod member 306 extending through slot 364 such that latch 310 is disposed within oblong opening 366, retaining bosses 368 retain the relative angular position between handle 304 and threaded rod member 306 about axis 350. Thus, the handle and rod member are seated and angularly retained to each other, and their mutually retained relationship is facilitated by threaded rod member 306 being releasably captured within slot 364 after having been forced past bosses 368, which elastically deform to permit passage of the rod 306 therepast.

Figure 23:
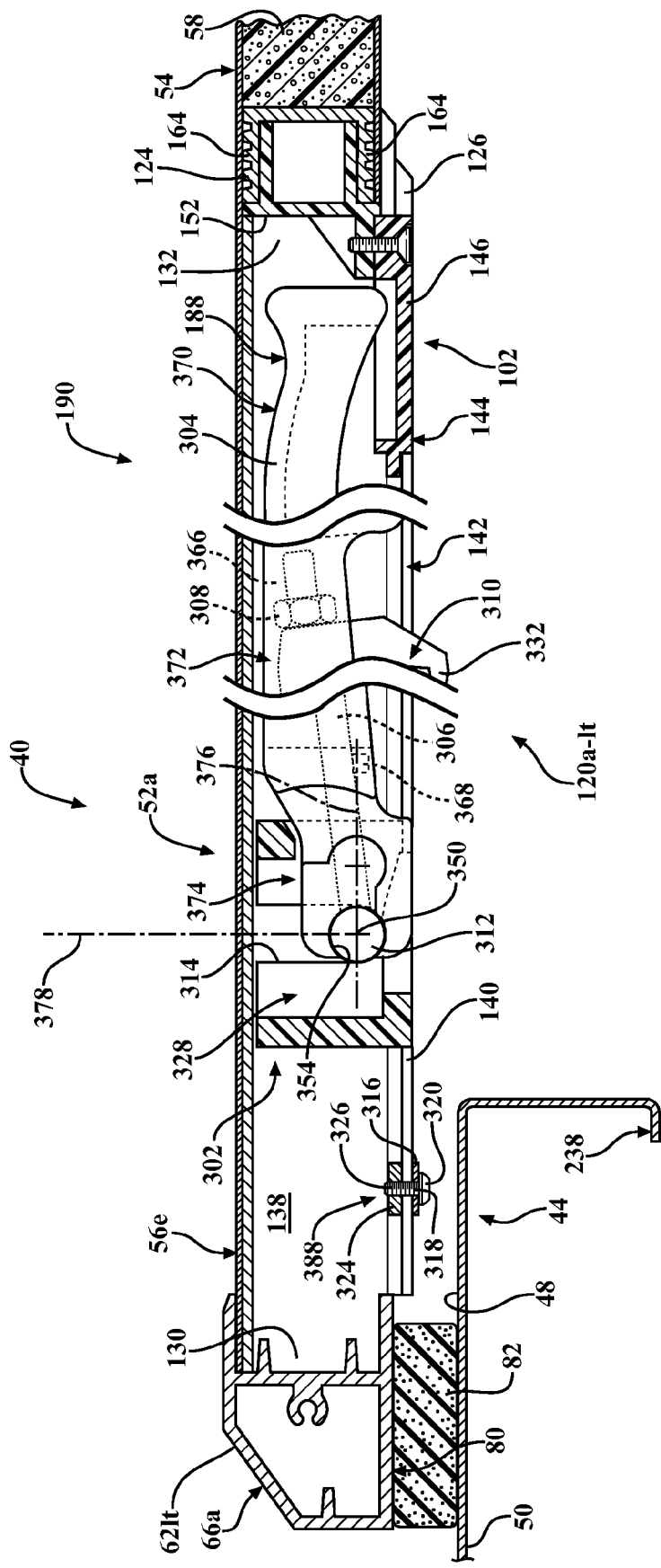
FIG. 23 is a view similar to FIG. 19, showing the rear clamp mechanism in its stowed position.

Handle 304 is provided with a handgrip 370 by which the rotation or pivoting of handle 304 about axis 350 may be effected; the terminal end of handgrip 370 is slid into pocket 188 in the stowed position 190, as shown in FIG. 23. Oblong opening 366 is located in intermediate handle portion 372, which is located along the length of handle 304 between its handgrip 370 and its head 374. Head 374 is disposed within void 328 of block member 302, and carries trunnion 312.

Referring to FIGS. 24A through 24D, it is shown that handle 304 defines an imaginary plane 376 in which parallel axes 350 and 358 are both contained and fixed. Referring to FIGS. 25A through 25C, it can be seen that block member 302 includes an imaginary plane 378 that extends along and equally bisects the opposed pair of U-shaped, substantially vertically oriented trunnion slots 314. Plane 378 is therefore substantially perpendicular to substantially horizontal plane 96. Handle plane 376 and block member plane 378 both contain pivot axis 350 at all times, with axis 350 fixed in handle plane 376 and moveable in block member plane 378. In the clamped position 386 of clamp mechanism 300 in which threaded rod member 306 is retained in slot 364, planes 376 and 378 are substantially co-planar, as shown in FIG. 19. As handle 304 is rotated out of retaining engagement with rod 306 in the counterclockwise direction of arrow 348 (FIG. 21), planes 376 and 378 pivot and become angularly separated about axis 350. It can be understood with reference to FIGS. 19 through 23 that the vertical distance between axes 350 and 358 parallel to plane 378 is near its maximum when clamp mechanism 300 is in its clamped position 386, with handle 304 in its retaining engagement with threaded rod 306, and bearing surfaces 356 are seated in detents 362. With latch 310 oriented to become operatively engaged with cargo bed lip 238, downward movement of the handle 305 in the clockwise direction of arrow 348 towards the clamped position forces trunnion 312 and latch 310 upwardly relative to cargo box lip 238, which draws cargo box surfaces 348 and cover surfaces 80 together, thereby compressing seal 88, and bringing panel 52$_a$ of cover 40 and cargo bed 44 into clamped engagement. Clamp mechanism 300 is thus latched in its clamped position 386 once handle 304 and rod 306 are mutually retained. This movement of trunnion 312, its axis 350, and/or latch 310 upwardly (or downwardly) relative to cargo box lip 238 may be referred to clamping movement.

Figure 21:
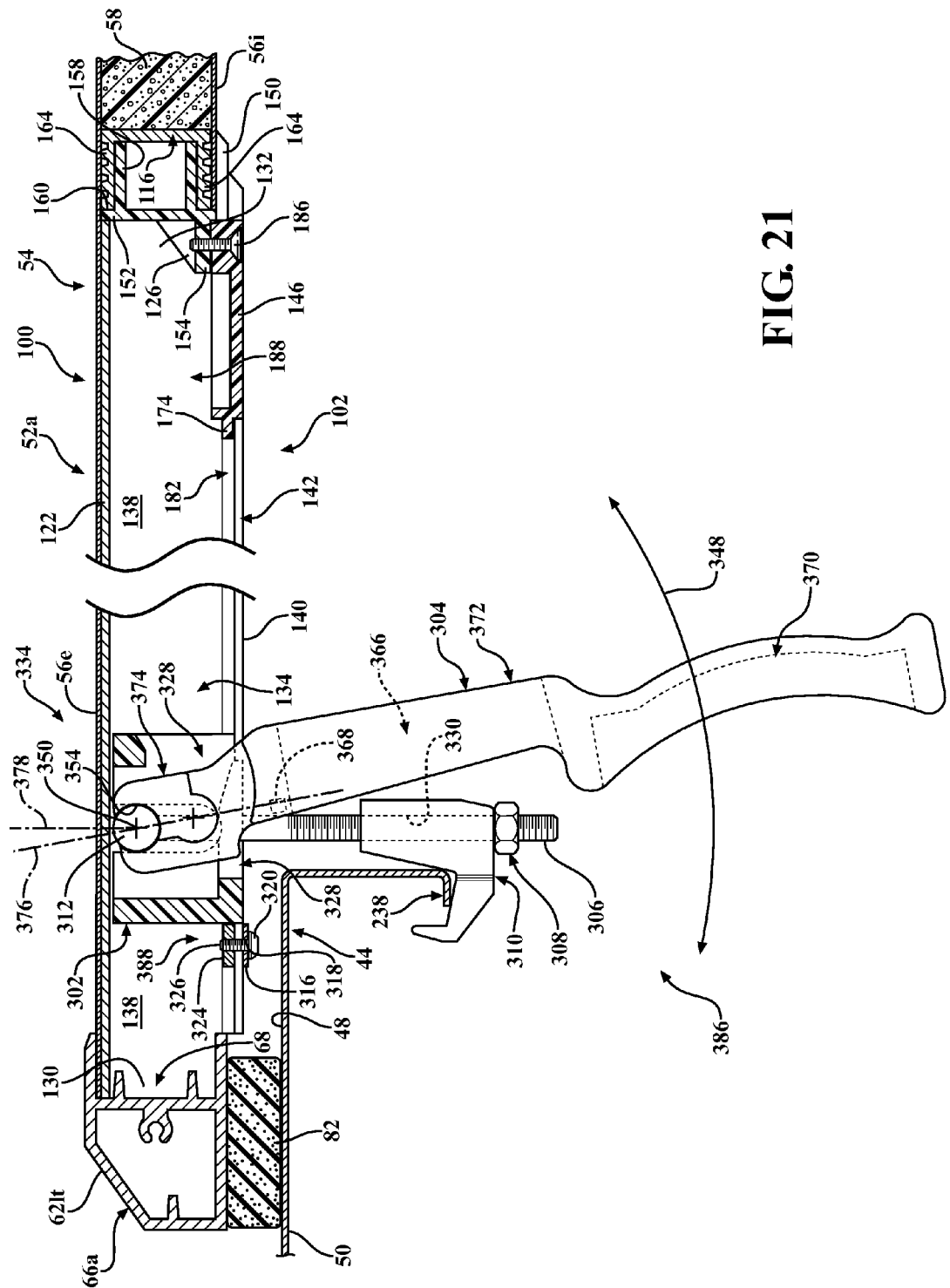
FIG. 21 is a view similar to FIG. 19, showing the rear clamp mechanism engaging a truck cargo box side wall, but with its handle in a depending position relative to the block member and the handle and clamp shaft angularly unretained to each other.
Figure 22:
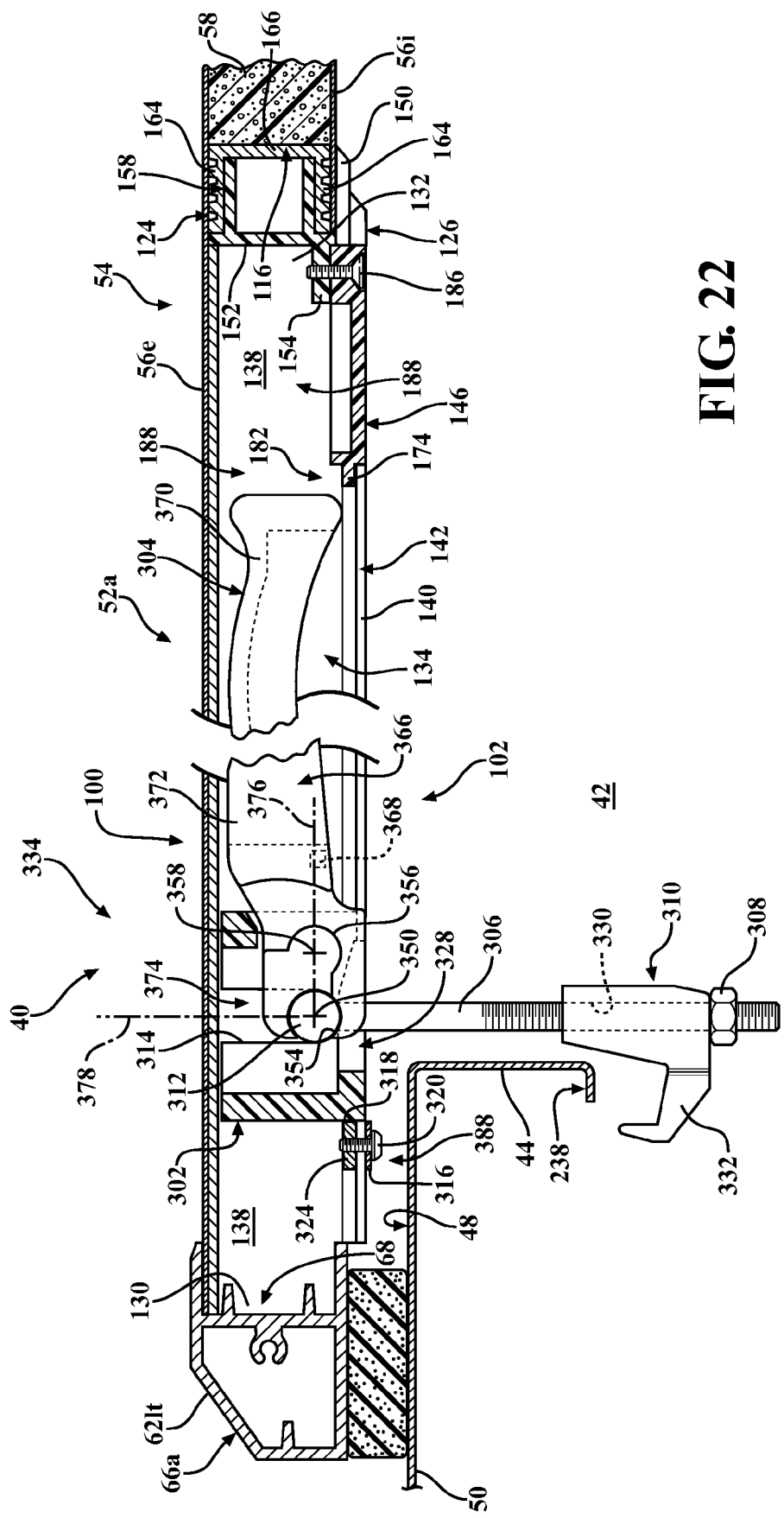
FIG. 22 is a view similar to FIG. 19, but showing the handle in an elevated position relative to the block member and the clamp shaft in a depending position relative to the side member, the rear clamp mechanism in a nonoperational position wherein it is out of engagement with the truck cargo box side wall.

In unlatching clamp mechanism 300, handle 304 is rotated counterclockwise in the direction of arrow 348 out of its retaining relationship with rod 306, as shown in FIG. 21, and pivoted or rotated about axis 350 relative to block member 302. Consequently, trunnion 312 and its axis 350 have clamping movement downwardly in U-shaped trunnion slots 314 until handle 304 is positioned within channel 134 as shown in FIG. 22. In this position, the vertical distance parallel to plane 378 between axes 350 and 358 is at a minimum, and handle plane 376 is now substantially horizontal and perpendicular to block member plane 378. The reduction in vertical distance between axes 350 and 358 urges trunnion 312 downwardly along slots 314, such that latch 310 is positioned out of engagement with cargo box lip 238. From this position, threaded rod member 306 and latch 310 may be rotated or pivoted about axis 350 from their depending position to an elevated position relative to block member 302, and retained relative to handle 304 in oblong recess 366. The clamp mechanism 300 can then be slid out of abutting contact with stop bar 324 of stop mechanism 388 and into its slowed position 190 in which the terminal end of handgrip 370 becomes disposed in pocket 188. In the stowed position 190 of clamp mechanism 300, handle 304 and rod member 306 are both held in an elevated position relative to block member 302, and the clamp mechanism is held securely against cover 40 such that it is not damaged by and does not cause damage to, the rest of cover 40 or anything else while cover 40 is in its various folded states. In the stowed position 190 shown in FIG. 23, panel $52_a$ and panel $52_b$ may be folded over themselves and together over panel $52_c$, which remains clamped to cargo box 44 through its front clamp mechanisms 200.

Generally, third or front panel $52_c$ of cover 40 remains fixed in position relative to truck cargo box 44 by being directly fastened or clamped to the cargo box as described above. In addition to the clamped front panel $52_c$, the cover 40 may be fixed in position over space 42 when unfolded by selectively fastening or clamping the rear panel $52_a$ and perhaps the center panel $52_b$ to the cargo box 44 of the truck. However, in the exemplary embodiment, center panel $52_b$ is not provided with a clamping mechanism and is not directly fastened to the cargo box 44. Rather, the rigid cover 40, once unfolded over the top of the cargo box 44, is secured in place over the space 42 within by only the front $52_c$ and the rear $52_a$ panels being fastened or clamped to the cargo box 44. Additionally securing center panel $52_b$ to the cargo box 44 to secure the cover 44 has been found to be unnecessary due to the substantial rigidity of the individual panels 52 and spacer rail member 76 and their hinged interconnections, and of the tonneau cover 40 itself when unfolded and secured to cargo box 44 only at the laterally opposite sides of panels $52_a$, $52_c$.

To retain a clamp mechanism 300 in its stowed position 190 when cover 40 is completely removed from cargo box 44, screws 320 of stop mechanism 388 may be loosened, lock bar 316 and stop bar 324 moved laterally inwardly relative to panel $52_a$ into abutting contact with block member 302, and screws 320 retightened. The positions of the stop mechanisms 388 that correspond with the clamp mechanism operative positions 334 for a particular installation may be marked on their respective flanges 140, and the stop mechanisms 388 returned to those positions upon reinstallation of cover 40 to the pickup truck 46. Preferably, when cover 40 is in its unfolded state, installed on cargo box 44, clamp mechanisms 300 will remain latched.

The invention has been described in an illustrative manner, and it is to be understood that the terminology which has been used is intended to be in the nature of words of description rather than of limitation. It is now apparent to those skilled in the art that many modifications and variations of the present invention are possible in light of the above teachings. It is, therefore, to be understood that the invention may be practiced otherwise than as specifically described.

What is claimed is:

1. A tonneau cover for selectively enclosing a space within a cargo box, comprising:
    a substantially rigid panel having spaced front and rear edges;
    said substantially rigid panel having opposite side edges between which said front and rear edges laterally extend, said substantially rigid panel provided with an elongate channel laterally extending between a proximate end located proximate one of said side edges and a distal end at which said channel terminates; and
    a clamp mechanism slidably engaged with said channel, said clamp mechanism having operative and stowed positions spaced along said channel, said clamp mechanism comprising:
        a handle,
        a block member slidably received in said channel with said handle and said block member having relative movement,
        an elongate rod member coupled to said handle and said block member with said handle and said rod member having relative movement, and
        a latch member coupled to said rod member and moveable between a clamped position for operatively engaging a portion of the cargo box and a released position for spacing said latch member from and placing said latch member out of operative engagement with the cargo box;
        said handle and said rod member at least partially positioned in said channel when in said clamp mechanism stowed position;
        wherein said substantially rigid panel has a pocket located at said channel distal end, said pocket having an opening aligned with said channel, and said handle is at least partially received in said pocket when in said clamp mechanism stowed position.

2. The invention of claim 1, wherein said rod member and said handle are selectively angularly retained to each other in said clamp mechanism operative and stowed positions.

3. The invention of claim 2, wherein said rod member and said latch member are at least partially contained within said handle when said rod member and said handle are angularly retained to each other.

4. The invention of claim 1, wherein said clamp mechanism further comprises a pivot member having a pivot axis, said block member and said handle are in sliding engagement with each other during relative angular movement therebetween, said rod member and said handle are pivotably coupled about said pivot axis, and said latch member has a selected position along said rod member relative to said pivot axis.

5. The invention of claim 1, wherein said clamp mechanism further comprises a pivot member having a pivot axis, said rod member extends between said latch member and said pivot member in a direction substantially perpendicular to said pivot axis, and said block member and said rod member are pivotably coupled through said pivot member.

6. The invention of claim 5, wherein said pivot member has clamping movement relative to said block member in a direction substantially perpendicular to said pivot axis.

7. The invention of claim 1, wherein said substantially rigid panel comprises a frame that defines said front, rear and side edges of said substantially rigid panel, an elongate clamp track member defining said channel, and an elongate clamp track support rail, the opposite ends of said clamp track support rail and one end of said elongate clamp track member connected to said frame, the other end of said elongate clamp track member supported by said clamp track support rail.

8. The invention of claim 7, wherein said substantially rigid panel comprises a composite sheet member surrounded by said frame and having exterior and interior sheets respectively defining opposite sides of said substantially rigid panel and a substantially rigid planar core disposed between and affixed to said exterior and interior sheets; and
    said elongate clamp track member is disposed in a cooperating slot extending through the thicknesses of said interior sheet and said core of said substantially rigid panel.

9. The invention of claim 7, further comprising a clamp track end support; and
    wherein the other end of said elongate clamp track member is supported by said clamp track support rail through an intermediary said clamp track end support, a portion of said intermediary clamp track end support is disposed in said distal end of said channel, and said intermediary clamp track end support is connected to said clamp track support rail.

10. The invention of claim 9, wherein said clamp track member includes an opening to said channel through which said block member of said clamp mechanism is received into and is removed from said channel; and further comprising a cover plate selectively positioned over said opening and secured to said clamp track member and said clamp track end support, whereby said opening is closed by said cover plate.

11. The invention of claim 10, wherein a pocket is defined at said distal end of said channel by said cover plate and said clamp track member, and said handle is received in said pocket in said clamp mechanism stowed position.

12. The invention of claim 1, wherein said channel is a first channel and further comprising a second said channel, and a second said clamp mechanism slidably engaged with said second channel;
wherein said distal ends of said first and second channels are laterally spaced from each other, said distal end of neither of said first and second channels being located between said proximate and distal ends of the other said channel.

13. A clamp mechanism comprising:
a handle;
a block member with said handle and said block member having relative movement;
an elongate rod member coupled to said handle with said handle and said rod member having relative movement, said rod member coupled to said block member and having angularly spaced depending and elevated positions relative to said block member;
a latch member connected to said rod member and having clamped and released positions when said rod member is in said depending position, said latch member having a first spacing from said block member in said clamped position, and a second spacing from said block member in said released position with said second spacing being greater than said first spacing;
wherein movement of said latch member between said clamped and released positions is urged by said relative movement between said handle and said rod member; and
a pivot member having a pivot axis, said block member and said handle in sliding engagement with each other during relative angular movement therebetween, said rod member and said handle pivotably coupled about said pivot axis, said latch member having a selected position along said rod member relative to said pivot axis.

14. The invention of claim 13, wherein said rod member and said handle are selectively angularly retained to each other.

15. The invention of claim 14, wherein said rod member and said latch member are at least partially contained within said handle when said rod member and said handle are angularly retained to each other.

16. The invention of claim 13, wherein said handle and said rod member are pivotably coupled about a pivot axis and said handle includes a bearing surface slidably engaged with said block member and that defines a bearing axis, said pivot and bearing axes being spaced and substantially parallel and lying in an imaginary plane fixed relative to said handle, said imaginary plane having substantially perpendicular orientations relative to said block member in said clamped and released positions, respectively.

17. The invention of claim 13, further comprising a pivot member having a pivot axis, said rod member extending between said latch member and said pivot member in a direction substantially perpendicular to said pivot axis, said block member and said rod member pivotably coupled through said pivot member.

18. The invention of claim 17, wherein said pivot member has clamping movement relative to said block member in a direction substantially perpendicular to said pivot axis.

19. The invention of claim 18, wherein said movement of said latch between said clamped and released positions is induced by said clamping movement of said pivot member.

20. The invention of claim 18, wherein said pivot member clamping movement is induced by said relative movement between said handle and said rod member.

21. A method of operating a clamp mechanism for clamping first and second objects together, comprising the steps of:
positioning a block member of the clamp mechanism engaged with the first object to place the clamp mechanism in an operative position relative to the first object;
pivotably moving a rod member of the clamp mechanism relative to the block member into a depending position relative to the block member and positioning a latch member of the clamp mechanism connected to the rod member to become operatively engaged with the second object;
moving a handle of the clamp mechanism relative to the rod member and thereby moving the latch member towards the block member and into operative engagement with the second object; and
drawing the first object and second object towards each other and into clamped engagement by shortening a distance between the block member and the latch member by rotatably moving the handle relative to the block member;
wherein the pivot axis and latch member are selectively distanced along the rod member, and further comprising the step of inducing clamping movement of the pivot axis relative to the block member by rotatably moving the handle relative to the block member between elevated and depending positions relative to the block member.

22. The method of claim 21, wherein said step of drawing the first object and second object towards each other and into clamped engagement includes rotatably moving the handle about a pivot axis between elevated and depending positions relative to the block member.

23. A tonneau cover for selectively enclosing a space within a cargo box, comprising:
a substantially rigid panel having spaced front and rear edges;
said substantially rigid panel having opposite side edges between which said front and rear edges laterally extend, said substantially rigid panel provided with an elongate channel laterally extending between a proximate end located proximate one of said side edges and a distal end at which said channel terminates; and
a clamp mechanism slidably engaged with said channel, said clamp mechanism having operative and stowed positions spaced along said channel, said clamp mechanism comprising:
a handle,
a block member moveably received in said channel with said handle and said block member having relative movement, an elongate rod member coupled to said handle and said block member with said handle and said rod member having relative movement, and a latch member coupled to said rod member and moveable between a clamped position for operatively engaging a portion of the cargo box and a released position for spacing said latch member from and placing said latch member out of operative engagement with the cargo box;

said handle and said rod member at least partially positioned in said channel when in said clamp mechanism stowed position;

wherein said substantially rigid panel comprises a frame that defines said front, rear and side edges of said substantially rigid panel, an elongate clamp track member defining said channel, and an elongate clamp track support rail, the opposite ends of said clamp track support rail and one end of said elongate clamp track member connected to said frame, the other end of said elongate clamp track member supported by said clamp track support rail.

24. The invention of claim 23, wherein said channel is further defined as a first channel and further including a second channel having a second proximate end and a second distal end at which said second channel terminates, with said distal ends of said first and second channels being laterally spaced from each other, and a second said clamp mechanism slidably engaged with said second channel.

25. A tonneau cover for selectively enclosing a space within a cargo box, comprising:
a frame defining spaced front and rear edges with said frame having opposite side edges between which said front and rear edges laterally extend;
an elongate clamp track support rail having opposite ends with said ends being coupled to said frame;
a elongate clamp track member defining an elongate channel with said clamp track member laterally extending between a proximate end coupled to one of said side edges of said frame and a distal end supported by said clamp track support rail with said channel terminating at said distal end; and
a clamp mechanism slidably engaged with said channel, said clamp mechanism having operative and stowed positions spaced along said channel, said clamp mechanism comprising:
a handle,
a block member moveably received in said channel with said handle and said block member having relative movement,
an elongate rod member coupled to said handle and said block member with said handle and said rod member having relative movement, and
a latch member coupled to said rod member and moveable between a clamped position for operatively engaging a portion of the cargo box and a released position for spacing said latch member from and placing said latch member out of operative engagement with the cargo box;
said handle and said rod member at least partially positioned in said channel when in said clamp mechanism stowed position.

26. The invention of claim 25, wherein said channel is further defined as a first channel and further including a second channel having a second proximate end and a second distal end at which said second channel terminates, with said distal ends of said first and second channels being laterally spaced from each other, and a second said clamp mechanism slidably engaged with said second channel.

27. A tonneau cover for selectively enclosing a space within a cargo box, comprising:
a frame defining spaced front and rear edges with said frame having opposing first and second side edges between which said front and rear edges laterally extend;
a first elongate clamp track member defining a first elongate channel with said first clamp track member laterally extending between a first proximate end coupled to said first side edge of said frame and a first distal end at which said first elongate clamp track member terminates with said first distal end being spaced from said side edges;
a second elongate clamp track member defining a second elongate channel with said second clamp track member laterally extending between a second proximate end coupled to said second side edge of said frame and a second distal end at which said second elongate clamp track member terminates with said second distal end being spaced from said side edges, and said first and second distal ends of said first and second elongate clamp track members being laterally separated and spaced from each other to define a laterally extending distance between said first and second distal ends such that said first and second distal ends are not directly interconnected; and
a clamp mechanism slidably engaged with each of said first and second channels, each of said clamp mechanisms having operative and stowed positions along said first and second channels between said respective proximate and distal ends, each of said clamp mechanisms comprising:
a handle,
a block member moveably received in said channel with said handle and said block member having relative movement,
an elongate rod member coupled to said handle and said block member with said handle and said rod member having relative movement, and
a latch member coupled to said rod member and moveable between a clamped position for operatively engaging a portion of the cargo box and a released position for spacing said latch member from and placing said latch member out of operative engagement with the cargo box;
said handle and said rod member at least partially positioned in one of said channels when in said clamp mechanism stowed position.

* * * * *